United States Patent
Abraham et al.

(10) Patent No.: US 11,057,901 B2
(45) Date of Patent: *Jul. 6, 2021

(54) CHANNEL ALLOCATION AMONG MULTIPLE RADIO FREQUENCY NETWORKS

(71) Applicant: Intel Corporation, Santa Clara, CA (US)

(72) Inventors: Alvin Abraham, Bangalore (IN); Raghavendra Ramesh Rao, Bangalore (IN); Balachandar Santhanam, Bangalore (IN)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/286,082

(22) Filed: Feb. 26, 2019

(65) Prior Publication Data

US 2020/0029336 A1 Jan. 23, 2020

Related U.S. Application Data

(63) Continuation of application No. 15/253,600, filed on Aug. 31, 2016, now Pat. No. 10,264,590.

(51) Int. Cl.
*H04W 72/06* (2009.01)
*H04W 16/14* (2009.01)

(52) U.S. Cl.
CPC .......... *H04W 72/06* (2013.01); *H04W 16/14* (2013.01)

(58) Field of Classification Search
None
See application file for complete search history.

(56) References Cited

U.S. PATENT DOCUMENTS

| 5,594,943 | A | 1/1997 | Balachandran |
| 6,493,331 | B1* | 12/2002 | Walton ................ H04W 52/24 370/341 |
| 2003/0123425 | A1* | 7/2003 | Walton ............... H04W 52/241 370/341 |
| 2008/0216133 | A1 | 9/2008 | Vergoossen |
| 2013/0336241 | A1 | 12/2013 | Keon |
| 2014/0313979 | A1 | 10/2014 | Himayat et al. |
| 2015/0365946 | A1 | 12/2015 | Luong |
| 2016/0044685 | A1 | 2/2016 | Nekovee |
| 2016/0088631 | A1 | 3/2016 | Hedayat et al. |
| 2016/0127264 | A1* | 5/2016 | Williamson ......... H04L 1/0009 370/437 |
| 2016/0302125 | A1 | 10/2016 | Tejedor et al. |

(Continued)

OTHER PUBLICATIONS

OIC, "OIC Smart Home Device Specification V1.0.0," 2015 Open Interconnect Consortium (OIC), 23 pages.

(Continued)

*Primary Examiner* — Saumit Shah
(74) *Attorney, Agent, or Firm* — Schwabe, Williamson & Wyatt, P.C.

(57) ABSTRACT

Methods, systems, and storage media for dynamic allocation of communication channels among multiple wireless networks are disclosed. The example embodiments may provide interference mitigation and control among a plurality of wireless protocols operating in an environment. Other embodiments may be disclosed and/or claimed.

26 Claims, 9 Drawing Sheets

(56) References Cited

U.S. PATENT DOCUMENTS

2017/0142733 A1    5/2017  Wang et al.

OTHER PUBLICATIONS

OIC, "OIC Security Specification V1.0.0," 2015 Open Interconnect Consortium (OIC), 95 pages.
OIC, "OIC Resource Type Specification V1.0.0," 2015 Open Interconnect Consortium (OIC), 150 pages.
OIC, "OIC Remote Access Specification V1.0.0," 2015 Open Interconnect Consortium (OIC), 23 pages.
OIC, "OIC Core Specification V1.0.0 Part 1," 2015 Open Interconnect Consortium (OIC), 165 pages.
International Search Report and Written Opinion dated Nov. 2, 2017 for International Application No. PCT/US2017/043365; 18 pages.
Office Action dated May 23, 2018 for U.S. Appl. No. 15/253,600, 26 pages.

* cited by examiner

400

| Classification/Rank | Definition |
|---|---|
| Class 1 | Channels where there is no interference, e.g., non-overlapping channels with the aggressor network. |
| Class 2a | Channels experiencing interference from the aggressor network can be considered as AWGN and operate with a relatively high data rate. |
| Class 2b | Channels experiencing interference from the aggressor network can be considered as AWGN and operate with a relatively low data rate. |
| Class 3a | Channels at the edge of flat spectrum interference and operate with a relatively high data rate. |
| Class 3b | Channels at the edge of flat spectrum interference and operate with a relatively low data rate. |
| Class 3c | Channels operating in 'bumpy' spectrum of interference and operate with a relatively high data rate. |
| Class 3d | Channels operating in 'bumpy' spectrum of interference and operate with a relatively low data rate. |

Fig. 4

| Entry | 1 | 2 | 3 |
|---|---|---|---|
| Protocol | IEEE 802.11b | IEEE 802.11n | ZigBee |
| Modulation Schema | DSSS | OFDM | OQPSK, DSSS |
| Data rate of available channel | 350 Mbps | 72 mbps | 250 kbps |
| Available channel | 4 | 9 | 11 - 26 |
| Interference signature | aggressor | aggressor | • Channels 13-17: Direct overlap;<br>• Channels 11,12, 22-26: no overlap - Class 1<br>• Channels 15,16: AWGN – Class 2<br>• Channels 14,17 bumpy high data rate – Class 3a<br>• Channels 19-22: bumpy low data rate – Class 3d |

Fig. 5

| Entry | 1 | 2 | 3 | 4 |
|---|---|---|---|---|
| Protocol | IEEE 802.11n | ZigBee | Thread | ZigBee |
| Modulation Schema | OFDM | OQPSK, DSSS | OQPSK, DSSS | OQPSK, DSSS |
| Number of Channels | 13 | 16 | 16 | 16 |
| Bandwidth per channel | 20 MHz | 5 Mhz | 5 Mhz | 5 Mhz |
| Max power per channel | 20 dBm | 1 mW | 1 mW | 1 mW |
| Max data rate per channel | 288.9 Mbps | 250 kbps | 250 kbps | 250 kbps |
| Available channel | 5 | 18 | 12 | 16 |
| Power of available channel | 19 dBm | 19 dBm | 0.99 mW | 0.9 mW |
| Data rate of available channel | 350 Mbps | 100 kbps | 90 kbps | 90 kbps |
| Interference signature | aggressor | bumpy interference; victim | non-overlapping; victim | AWGN; victim |
| Class/Rank | n/a | 3c | 1 | 2a |

Fig. 6

CHANNEL ALLOCATION AMONG MULTIPLE RADIO FREQUENCY NETWORKS

CROSS REFERENCE TO RELATED APPLICATION

This application is a continuation application of U.S. patent application Ser. No. 15/253,600, entitled "CHANNEL ALLOCATION AMONG MULTIPLE RADIO FREQUENCY NETWORKS," filed Aug. 31, 2016, the contents of which is hereby incorporated by reference in its entirety.

FIELD

The present disclosure relates to the fields of wireless communications, and in particular, to apparatuses, methods and storage media for dynamic allocation of communication channels for environments having multiple radio frequency networks operating therein.

BACKGROUND

The Internet of Things ("IoT") is a network of objects or "things", each of which is embedded with hardware or software that enable connectivity to the Internet. An object, device, sensor, or "thing" (also referred to as an "IoT device") that is connected to a network typically provides information to a manufacturer, operator, or other connected devices or clients in order to track information from or about the object or to obtain or provide services. IoT devices are deployed in homes, offices, manufacturing facilities, and the natural environment. IoT devices may also be referred to as machine-type communications (MTC) devices, machine-to-machine (M2M) devices, and the like.

Device manufacturers and/or service providers are developing and deploying IoT devices at an increasing rate in order to fulfill an increasing demand to track data and/or obtain services using one or more IoT devices. Since different manufacturers and/or service providers develop and deploy various IoT devices, the IoT devices deployed in a given environment may communicate according to different wireless communications protocols. Many of these protocols operate in the same 2.4 gigahertz (GHz) band, an industrial-scientific-medical (ISM) band, and/or one or more unlicensed bands that operate independently of one another. Although each wireless communications protocol may provide mechanisms for avoiding or mitigating interference, since these wireless communications protocols may operate independently of each other, radio frequency (RF) transmissions from the various IoT devices in the environment may cause interference and reduce the overall throughput of a particular network. This interferences and reduction of throughput may result in a lower Quality of Service (QoS) and/or Quality of Experience (QoE) for the IoT devices/services in the environment.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 4 illustrates an example dynamic channel allocation classification scheme, according to various embodiments;

FIG. 5 illustrates an example of dynamic channel allocation database entries based on the classification scheme of FIG. 4, according to various embodiments;

FIG. 6 illustrates another example of dynamic channel allocation database entries based on the classification scheme of FIG. 4, according to various embodiments.

DETAILED DESCRIPTION

Figure 1A:
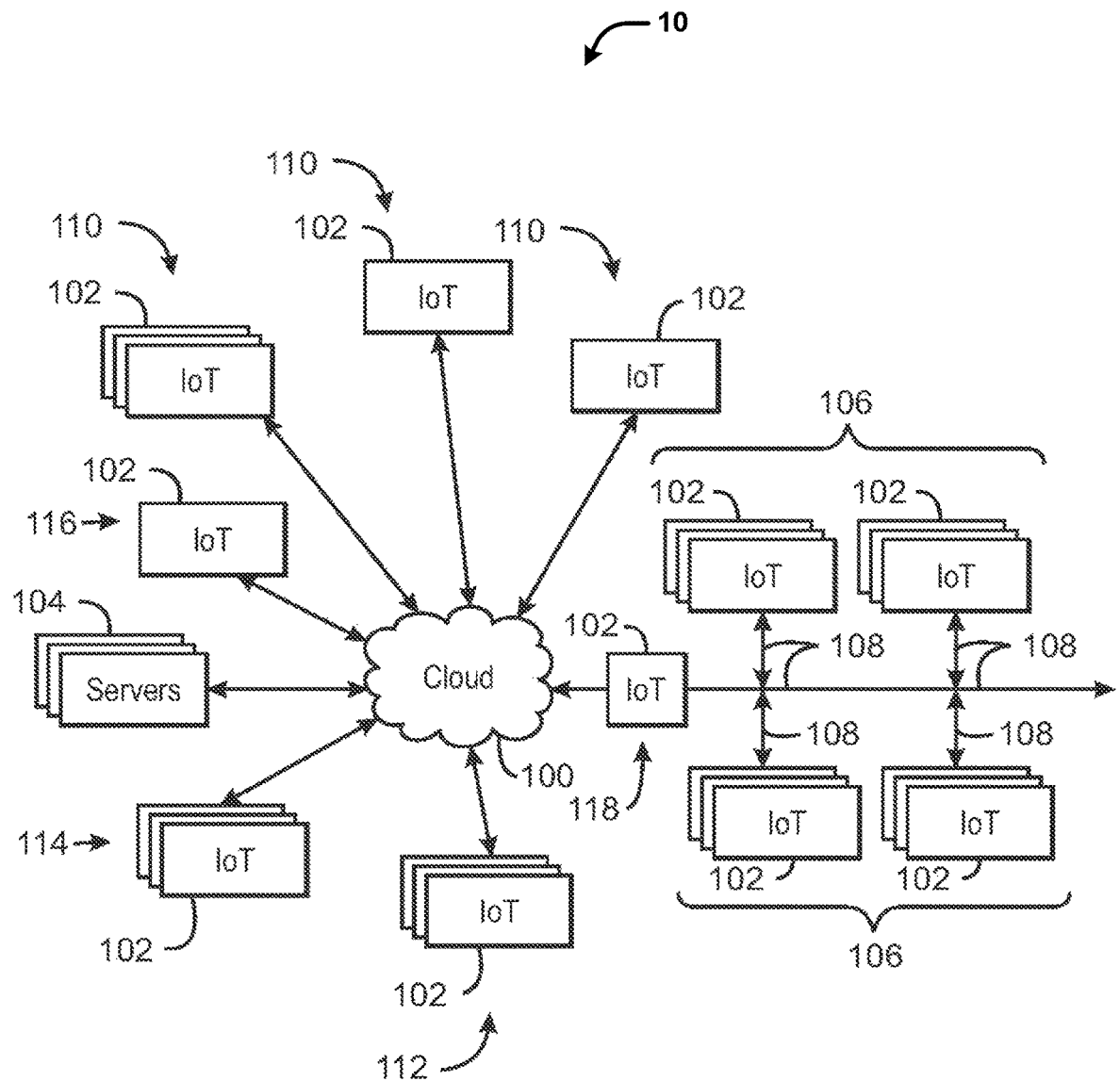
FIGS. 1A-1C illustrate various arrangements in which various example embodiments described in the present disclosure may be implemented.

In the following detailed description, reference is made to the accompanying drawings which form a part hereof wherein like numerals designate like parts throughout, and in which is shown by way of illustrated embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed to imply that the various operations are necessarily order-dependent. In particular, these operations might not be performed in the order of presentation. Operations described may be performed in a different order than the described embodiments. Various additional operations might be performed, or described operations might be omitted in additional embodiments.

The description may use the phrases "in an embodiment", "in an implementation", or in "embodiments" or "implementations", which may each refer to one or more of the same or different embodiments. Furthermore, the terms "comprising," "including," "having," and the like, as used with respect to embodiments of the present disclosure, are synonymous. The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

Also, it is noted that example embodiments may be described as a process depicted with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

As disclosed herein, the term "memory" may represent one or more hardware devices for storing data, including random access memory (RAM), magnetic RAM, core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

As used herein, the term "circuitry" refers to, is part of, or includes hardware components such as an Application Specific Integrated Circuit (ASIC), an electronic circuit, a logic circuit, a processor (shared, dedicated, or group) and/or memory (shared, dedicated, or group) that are configured to provide the described functionality. In some embodiments, the circuitry may execute computer-executable instructions to provide at least some of the described functionality. The computer-executable instructions may represent program code or code segments, software or software logic, firmware, middleware or microcode, procedures, functions, subprograms, routines, subroutines, one or more software packages, classes, or any combination of instructions, data structures, program statements, and/or functional processes that perform particular tasks or implement particular data types. The computer-executable instructions discussed herein may be implemented using existing hardware in computer devices and communications networks.

As used herein, the term "network element", may be considered synonymous to or referred to as a networked computer, networking hardware, network equipment, router, switch, hub, bridge, gateway, or other like device. The term "network element" may describe a physical computing device of a network with wired or wireless communication links. Furthermore, the term "network element" may describe equipment that provides radio baseband functions for data or voice connectivity between a network and one or more users. The term "channel" as used herein may refer to any transmission medium, either tangible or intangible, which is used to communicate data or a data stream. Additionally, the term "channel" may be synonymous with and/or equivalent to "communications channel," "data communications channel," "transmission channel," "data transmission channel," "access channel," "data access channel," "link," "data link," "radio link," "carrier," "radiofrequency carrier," and/or any other like term denoting a pathway or medium through which data is communicated. As used herein, the term "radio technology" refers to a technology for wireless transmission and/or reception of electromagnetic radiation for information transfer. The term "radio access technology" or "RAT" refers to the technology used for the underlying physical connection to a radio based communication network (e.g., cellular, mobile broadband, wireless local area network (WLAN), personal area network (PAN), etc.).

Example embodiments provide systems and methods for interference mitigation and control among a plurality of wireless protocols operating in an environment. An environment may include various computer devices that are capable of communicating with one another using one or more radio frequency (RF) transmissions in accordance with one or more wireless communications protocols. In embodiments, some of these computer devices may be "Internet of Things" (IoT) devices. The term "IoT device" may refer to any computer device, sensor, "smart object", "smart device", Machine Type Communications (MTC) devices, machine-to-machine (M2M) device, and/or any other like devices that are embedded with hardware and software components that enable the devices to communicate over a communications network (e.g., the Internet). Because IoT devices are enabled to communicate over a network, the IoT devices may exchange event-based data with service providers in order to enhance or complement the services provided by the service providers. These IoT devices are typically able to transmit data autonomously or with little to no user intervention. In embodiments, the IoT devices may communicate with network elements, client devices, or other IoT devices via a gateway (GW) device.

In embodiments, a GW may dynamically select a channel of operation for wireless communication. To do so, the GW may scan a frequency spectrum and determine one or more wireless protocols operating in the frequency spectrum and one or more available channels in the frequency spectrum. The GW may store the one or more wireless protocols in a database (DB), including their RF power levels, data rates, modulation schemas, and the like. The GW may determine an interference signature for each channel and classify each available channel according to their interference signature. The interference signature may indicate the amount of interference being caused by an "aggressor network," which is a network that interferes with other networks. The networks that are interfered with by an aggressor network may be referred to as "victim networks." In embodiments, if a channel is found to be a potential usable channel, the GW may perform another scan on that particular channel to make sure that no other networks of the same wireless protocol are operating in that channel. For example, in a ZigBee network, the GW may scan a selected ZigBee channel to make sure that no other ZigBee networks are operating in that ZigBee channel. Additionally, in various embodiments the GW may periodically scan the frequency spectrum for any changes in the interference signatures, and the severity of any newly detected interference may be analyzed by performing the algorithm again.

Figure 1B:
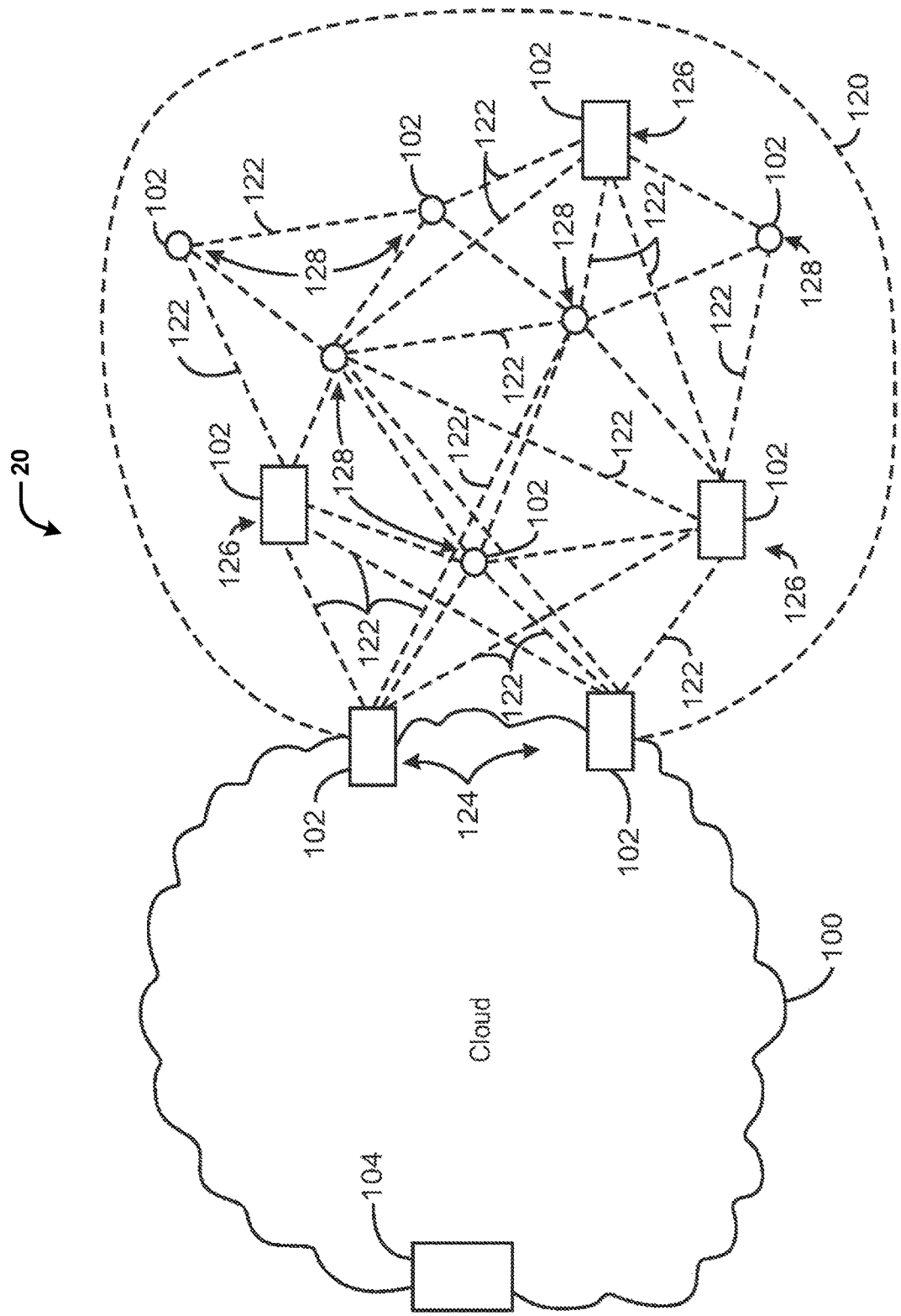
Figure 1C:
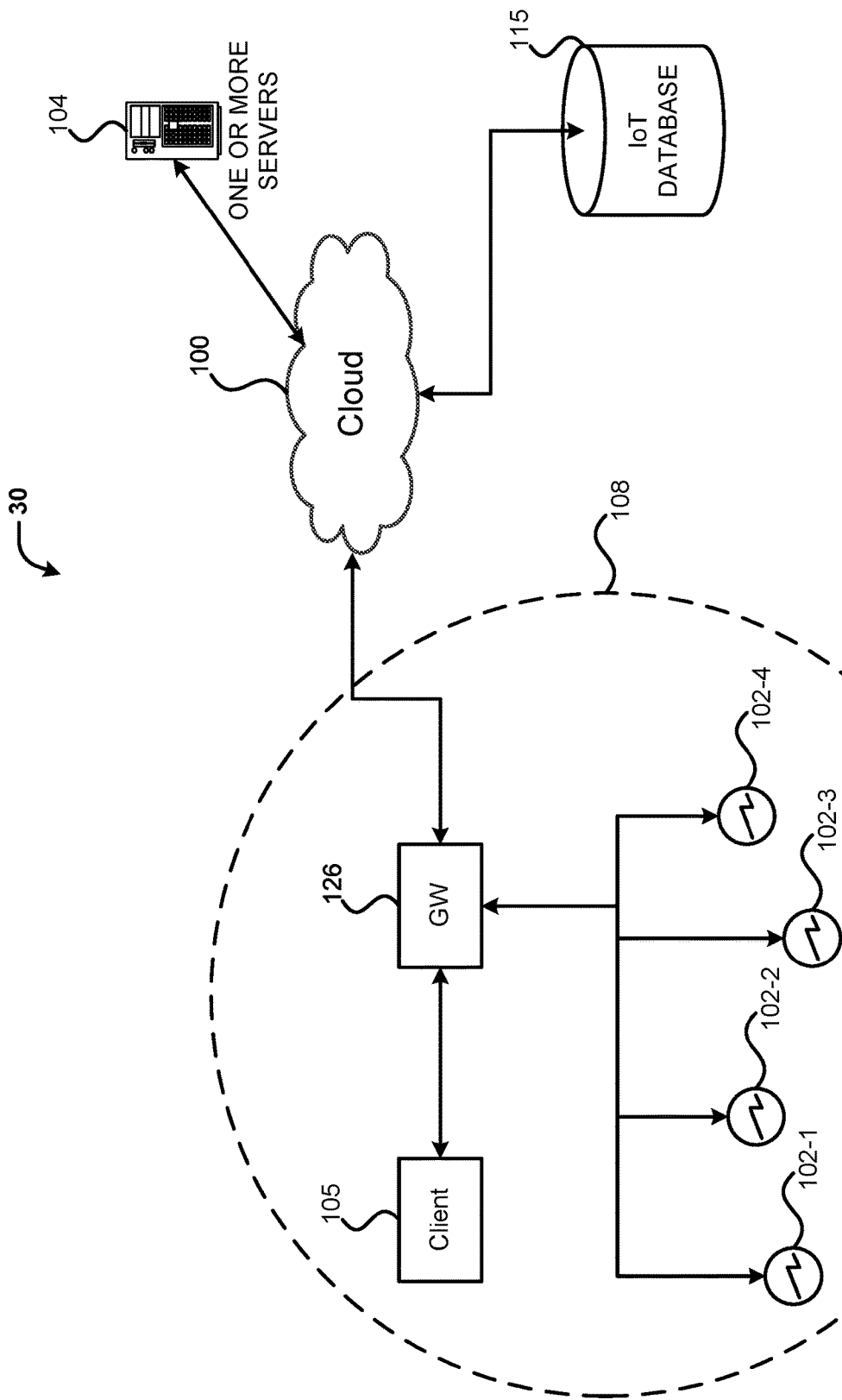

Referring now to FIGS. 1A-1C. IoT devices 102, gateways (GWs) 124, and client device 105 in environment 108 (which may be any physical space) may be capable of communicating using RF signals. The environment 108 may be a home (or room within a home), apartment building (or apartment within an apartment building), an office building (or an individual office within an office building), a factory, or other like space. In embodiments, the devices within the environment 108 may be a mesh network of IoT devices 102 and other computer devices, such as fog 120 shown and described with regard to FIG. 1B. In various embodiments, environment 108 may comprise one or more devices that provide multiple radio frequency networks, such as a wireless access point (AP) or wireless router that may provide a WLAN (not shown by FIGS. 1A-1C) in accordance with an Institute of Electrical and Electronics Engineers (IEEE) 802.11 protocol; one or more base stations and/or other network elements (not shown by FIG. 1) that may provide a cellular communications network such as next generation NodeBs (gNBs) for 3rd Generation Partnership Project (3GPP) Fifth Generation (5G)/New Radio (NR) networks, evolved nodeBs (eNBs) for 3GPP Long Term Evolution (LTE) networks, nodeBs for Universal Mobile Telecommunications System (UMTS) networks, base station system/subsystem (BSS) for Global System for Mobile Communications (GSM) and Enhanced Data GSM Environment (EDGE) networks, access points for IEEE 802.16 networks (referred to as WirelessMAN or Worldwide Interoperability for Microwave Access (WiMAX)), and the like; IoT devices 102, GWs 124, and/or client device 105 that may provide networks based on one or more IEEE 802.15.4 based protocols (e.g., a 6LoWPAN, ZigBee, Thread, etc.); Bluetooth or Bluetooth Low Energy (BLE) protocols; ANT protocol; 3GPP device-to-device (D2D). sidelink, or Proximity Services (ProSe) protocols; Z-Wave protocol; SigFox protocol; Platanus protocol; or Universal Plug and Play (UPnP) protocol. GWs 124, DAs 128, client device 105, and/or some IoT devices 102 may be equipped to the teachings of the present disclosure to efficiently/effectively operate in the multiple radio frequency networks environment.

A computer device (such as IoT devices 102, GWs 124, DAs 128, and/or client device 105) may be configured to determine, based on a scan of a desired frequency spectrum, one or more available channels, wherein at least one of the available channel is associated with a different wireless communication protocol than a wireless communication protocol of another available channel; determine, for each of the one or more available channels, a corresponding interference signature; assign, to each of the one or more available channels, a rank or classification based on the corresponding interference signature; select an available channel from among the one or more available channels based on assigned ranks; and transmit one or more data packets over the selected available channel in accordance with a wireless communication protocol associated with the selected available channel. The computer device may also be configured to instruct another device (e.g., an IoT device 102) to communicate over the selected available channel in accordance with wireless communication protocol of the selected channel. These and other aspects of the teachings of the present disclosure will be described more fully below.

FIG. 1A illustrates an arrangement 10 in which a cloud computing network 100, or cloud 100, in communication with a number of IoT devices 102, at least some of which are communicating with one or more servers 104. Cloud 100 may be any network that allows computers to exchange data, such as the Internet, a wide area network (WAN), a local area network (LAN), wireless local area network (WLAN), a cellular network, a personal network such as a proprietary network for a company, or any other such network or combination thereof. Cloud 100 may include one or more network elements (not shown) capable of physically or logically connecting computers. Components used for such a system can depend at least in part upon the type of network and/or environment selected. Protocols and components for communicating via such a network are well known and will not be discussed herein in detail. Communication over the network may be enabled by wired or wireless connections, and combinations thereof.

IoT devices 102 may be any object, device, sensor, or "thing" that is embedded with hardware and/or software components that enable the object, device, sensor, or "thing" to communicate with another device (e.g., client device 105, one or more servers 104, another IoT device 102, etc.) over a network (e.g., cloud 100) with little or no user intervention. In this regard, IoT devices 102 may include a communications circuitry, such as a transmitter/receiver (or alternatively, a transceiver), one or more memory devices, and one or more processors. To communicate with other devices, each of the IoT devices 102 may transmit and receive RF signals according to one or more wireless communications protocols.

The wireless communications protocols may be any suitable set of standardized rules or instructions implemented by radio equipment (e.g., client device 105, GW 126, the IoT devices 102, etc.) to communicate with other devices, including instructions for packetizing/depacketizing data, modulating/demodulating signals, implementation of protocols stacks, and/or the like. Examples of such wireless communications protocols may include, cellular communications protocols (e.g., 5G/NR, LTE, UMTS, GSM, EDGE, Wi-MAX (IEEE 802.16), etc.), LAN or WLAN protocols (e.g., Wi-Fi-based protocols or IEEE protocols, such as IEEE 802.11 protocols, etc.), and person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, and the like; WiFi-direct; Bluetooth/BLE protocols; ANT protocols; Z-Wave; LTE D2D or ProSe; UPnP; and the like).

The IoT devices 102 may include any number of different types of devices, grouped in various combinations. For example, an IoT group 106 may include IoT devices 102 mounted or otherwise configured to monitor specific devices/systems deployed in an environment. Other groups of IoT devices 102, such as IoT group 110, IoT group 112, IoT group 114, and IoT group 116, may be mounted to or configured to monitor corresponding devices/systems deployed in the environment. The IoT groups 106, 110, 112, 114, and 116 may be in communication with the cloud 100 through a sub-network 108, such as a LAN, WLAN, and/or any other like network. The IoT devices 102 may use another IoT device 102 as a backend processing system 118 to various data and communicate with the cloud 100. Each of these IoT devices 102 may be in communication with other IoT devices 102, with client 105 (shown by FIG. 1C), with one or more servers 104, or any combination thereof.

FIG. 1B illustrates an arrangement 20 that may include a cloud computing network, or cloud 100, in communication with a mesh network of IoT devices 102, that may be termed a fog 120, operating at the edge of the cloud 100. To simplify the diagram, not every IoT device 102 is labeled.

The fog 120 may be considered to be a massively interconnected network wherein a number of IoT devices 102 are in communications with each other, for example, by radio links 122. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of devices are shown in the fog 120, GWs 124, data aggregators (DAs) 126, and sensors 128, although any combinations of devices and functionality may be used. The GWs 124 may be edge devices that provide communications between the cloud 100 and the fog 120, and may also provide the backend process function for data obtained from sensors 128, such as motion data, flow data, temperature data, and/or other types of sensor data. The DAs 126 may collect data from any number of the sensors 128, and perform the back end processing function for the analysis. The results, raw data, or both may be passed along to the cloud 100 through the GWs 124. In some cases, the GWs 124 and/or the DAs 126 may operate with little to no user intervention, and thus, may be considered to be IoT devices 102. In various embodiments, a GW 124 and/or a DA 126 may act as a coordinator or scheduler for communications between the various IoT devices 102 in the fog 120, including between multiple sensors 128, between sensors 128 and DAs 126, between sensors 128 and GWs 126, between GWs 126 and DAs 126, etc. The sensors 128 may be full IoT devices 102, for example, capable of both collecting data and processing the data. In some cases, the sensors 128 may be more limited in functionality, for example, collecting the data and allowing the DAs 126 or GWs 124 to process the data.

In various embodiments, one or more of the IoT devices 102 may compose themselves into an IoT group or cluster (e.g., IoT groups 106, 110, 112, 114, and 116 as discussed previously with regard to FIG. 1A) such that the IoT devices 102 in the group act as a functional device/system. The IoT devices 102 belonging to the IoT group composed into a functional device may be referred to as group or cluster members. In embodiments, a leader IoT device 102 may be selected (or elected) based on functions available that meet the needs of the group/cluster or criteria defined by an operator. In some embodiments, the selected/elected leader IoT device 102 may be a DA 126. The selected/elected leader IoT device 102 may send a request to find information from other available IoT devices 102 connected to and aware in the fog 120. When the leader IoT device 102 fails, a new leader IoT device 102 may be elected, and the new leader IoT device 102 may participate in satisfying the request. Other IoT devices 102 or portions of devices may compose together based on available micro-services to provide the leader IoT device 102 with the requested information within time constraints, accuracy, and/or other metrics that are sent along in the request. Clusters and groups may be banded and disbanded on an ad hoc basis or per defined groupings according to the needs of the requesting devices. Additionally, a failed member of the group/cluster may be replaced in the group/cluster as long as the service level agreement originally sent is reestablished. The various embodiments described herein may be performed or implemented by a GW 124, a DA 126, or another device that is capable of acting as an IoT network coordinator.

Communications from any IoT device 102 may be passed along a most convenient path between any of the IoT devices 102 to reach the GWs 124. In these networks, the number of interconnections provide substantial redundancy, allowing communications to be maintained, even with the loss of a number of the IoT devices 102. Further, the use of a mesh network may allow IoT devices 102 that are very low power or located at a distance from infrastructure to be used, as the range to connect to another IoT device 102 may be much less than the range to connect to the GWs 124. In various embodiments, the route or path that communications from an IoT device 102 takes may be determined and coordinated by a GW 124, a DA 126, or another device that is capable of acting as an IoT network coordinator.

The fog 120 of these IoT devices 102 devices may be presented to devices in the cloud 100, such as one or more servers 104, as a single device located at the edge of the cloud 100 (e.g., a fog device). In this example, the alerts coming from the fog device may be sent without being identified as coming from a specific IoT device 102 within the fog 120. For example, an alert may indicate that a deployed analog or digital device/system is having operational difficulties and present the relevant data, even though the specific IoT devices 102 that determined the problems are not specifically identified.

In some examples, the IoT devices 102 may be configured using an imperative programming style (e.g., with each IoT device 102 having a specific function and communication partners). However, the IoT devices 102 forming the fog device may be configured in a declarative programming style, allowing the IoT devices 102 to reconfigure their operations and communications, such as to determine needed resources in response to conditions, queries, and device failures. As an example, a query from a client device 105 via a server 104 about the operations of a subset of devices/systems monitored by the IoT devices 102 may result in the fog device selecting the IoT devices 102, such as one or more particular sensors 128, needed to answer the query. The data from these sensors 128 may then be aggregated and analyzed by any combination of the sensors 128, DAs 126, and/or GWs 124, before being sent on by the fog device to the server 104 to answer the query. In embodiments, IoT devices 102 in the fog 120 may select the sensors 128 used based on the query, such as adding data from one or more different types of sensors 128. If some of the IoT devices 102 are not operational, other IoT devices 102 in the fog device may provide analogous data, if available.

FIG. 1C shows an arrangement 30 in accordance with various embodiments. As shown in FIG. 1, arrangement 30 may include an environment 108, which may include IoT devices 102-1 to 102-4 (collectively referred to as "IoT devices 102" or individually referred to as "IoT device 102"), GW 124, and client device 105. Arrangement 30 may also include cloud 100, IoT database 115, and one or more servers 104.

Client device 105 may be a physical hardware device that is capable of running one or more applications. Client device 105 may include a transmitter/receiver (or alternatively, a transceiver or RF circuitry), memory, one or more processors, one or more sensors (e.g., accelerometers, gyroscopes, image sensors, Global Positioning System ("GPS") receiver, etc.), and/or other like components. Client device 105 may communicate (transmit/receive) data with one or more IoT devices 102 via GW 124, and communicate data with one or more servers 104 via GW 124 and cloud 100. Client device 105 may communicate with the various devices in arrangement 30 in accordance with one or more wireless or wired communications protocols as discussed herein. Client device 105 may communicate with one or more IoT device 102 in accordance with one or more wireless communications protocols as discussed herein. Client device 105 may be configured to run, execute, or otherwise operate one or more applications for controlling or communicating with the one or more servers 104 and/or the IoT devices 102. These applications may be native applications, web applications, and/or hybrid applications. Client device 105 may be a wireless cellular phone, a smartphone, a laptop personal computer (PCs), a tablet PC, a wearable computing device, a handheld messaging device, a personal data assistant, an electronic book reader, an augmented reality head-mounted (or helmet-mounted) display device, and/or any other physical or logical device capable of recording, storing, and/or transferring digital data.

According to various embodiments, the IoT devices 102 may communicate in accordance with different wireless communications protocols. For example, IoT devices 102-1 and 102-4 may include an IEEE 802.15.4 transceiver configured to communicate using an IEEE 802.15.4 based protocol, such as ZigBee, while IoT device 102-2 may be include a WiFi transceiver configured to communicate using WiFi signaling. In embodiments, some of the IoT devices 102 may be equipped with multiple communications logic allowing those IoT devices 102 to communicate using multiple wireless communications protocols. For example, IoT device 102-3 may include cellular modem circuitry configured to operate in accordance with a cellular communications protocol, such as LTE or LTE-Advanced. The cellular modem circuitry may also be configured to communicate with other devices in a PAN using LTE ProSe or D2D signaling. Furthermore, IoT device 102-3 may include a Bluetooth transceiver, which may allow IoT device 102-3 to communicate with other devices in a PAN using Bluetooth or BLE signaling.

In embodiments, the IoT devices 102 may be sensors or other like devices that can capture and/or record data associated with an event. For instance, in various embodiments, IoT devices 102 may be biotic devices such as monitoring implants, biosensors, biochips, and the like. Additionally, IoT devices 102 may be abiotic devices such as autonomous sensors, gauges, and/or meters, MTC devices, M2M devices, electro-mechanical devices (e.g., switch, actuator, etc.), and the like. In other embodiments, the IoT devices 102 may be a computer device that is embedded in a computer system and coupled with communications circuitry of the computer system. In embodiments where an IoT device 102 is embedded in a computer system, such an IoT device 102 may be a system on chip (SoC), a universal integrated circuitry card (UICC), an embedded UICC (eUICC), and the like. The computer system may be a mobile station (e.g., a smartphone), laptop PC, wearable PC (e.g., a smart watch), appliance (e.g., a television, refrigerator, a security system, etc.), and the like.

An event may be any occurrence of an action, such as a temperature change, an electrical output, a change in water usage, an inventory level/amount change, a heart rate, a glucose level, a state/position/orientation change of a device, and the like. In various embodiments, an event may be detected by one or more IoT devices 102 based on sensor outputs, timer values, user actions, and reported as messages to a computing device. Once data associated with an event is captured and recorded by an IoT device 102, the captured data may be relayed through the GW 124 and/or the cloud 100 and reported to a service provider (e.g., an operator of the one or more servers 104), client device 105, and/or another one of the IoT devices 102. The service provider, a user of the client device 105 or the client device 105 itself, and/or IoT device may take an appropriate action based on a notification of the event (e.g., reduce or increase temperature, restock inventory items, reduce/increase an activity level, reduce/increase sugar intake, and the like). In various embodiments, each of the IoT devices 102 may connect with or otherwise communicate with the client device 105 or other IoT devices 102 via a direct wireless connection. In such embodiments, the data associated with an event may be reported to the client device 105 or other IoT devices 102 via GW 124 without being relayed through the cloud 100. The IoT devices 102 may be configured to report data on a period or cyclical basis, or based on a desired event or trigger that is captured and recorded by an IoT device 102. In some embodiments, some of the IoT devices 102 may include one or more electro-mechanical components which allow these IoT devices 102 to change their states, positions, and/or orientations. These electro-mechanical components may include one or more motors, actuators, wheels, thrusters, propellers, claws, clamps, hooks, and/or other like electro-mechanical components. In such embodiments, the devices 102 may be configured to change their states, positions, and/or orientations based on one or more captured events and/or instructions or control signals received from a service provider (e.g., an operator of the one or more servers 104) and/or client device 105. In various embodiments, an operator may receive, from one or more IoT devices 102, data associated with a captured event and physically control the IoT devices 102 by transmitting instructions or other like control signals to the IoT devices 102.

GW 124 may be a network element that employs multi-radio frequency networks technology. GW 124 may be configured to provide communication services to IoT devices 102 and/or client device 105 operating within environment 108 by coordinating communications among the IoT devices 102 and client device 105 within the environment 108. In this regard, the GW 124 may act as a centralized hub and/or scheduler for the various devices within the environment 108, which may include for example, operating the dynamic channel allocation process of the example embodiments (e.g., process 700 as shown and described with regard to FIG. 7). In various embodiments, the GW 124 may also communicate data to/from the one or more servers 104 via the cloud 100 on behalf of the IoT devices 102 and/or client device 105. In this regard, GW 124 may act as a single point of contact between devices that are unable to directly connect to larger networks (e.g., cloud 100) and remote computer devices.

In embodiments, the GW 124 may be a standalone device that is specifically manufactured to provide IoT devices 102 connectivity to cloud 100, such as an IoT GW or an automation hub. In such embodiments, environment 108 may also include a wireless access point (WAP) or other like device that may provide network connectivity to the elements in environment 108 (not shown by FIGS. 1A-1C). Further, in such embodiments, the GW 124 may be communicatively coupled with the WAP through a wired or wireless connection. In other embodiments, the GW 124 may be a WAP, a home server coupled with RF communications circuitry, a smallcell base station (e.g., a femtocell, picocell, home evolved nodeB (HeNB), and the like), a router, a switch, a hub, a radio beacon, and/or any other like network device. The GW 124 may include one or more processors, communications circuitry (e.g., including a network interface, one or more transmitters/receivers connected to one or more antennas, and the like), and computer readable media. The one or more transmitters/receivers (or transceivers) may be configured to wirelessly transmit/receive RF signals to/from one or more IoT devices 102 and/or client device 105 within the environment 108, and the network interface may be configured to transmit/receive data to/from one or more servers 104 via cloud 100 using a wired connection. The GW 124 may process and/or route data packets over the wired connection according to one or more communications protocols, such as Ethernet (e.g., IEEE 802.1, 802.2, and 802.3 protocols); Point-to-Point Protocol (PPP) over Ethernet (PPPoE); PPP over asynchronous transfer mode (ATM) (PPPoA); High Level Data Link Control (HDLC); and/or any other like protocols.

IoT database 115 may be a system for storing information for a plurality of IoT devices. IoT database 115 may include one or more relational database management systems (RDBMS) one or more object database management systems (ODBMS), a column-oriented DBMS, correlation database DBMS, and the like. According to various example embodiments, the IoT database 115 may be stored on or otherwise associated with one or more data storage devices.

These data storage devices may include at least one of a primary storage device, a secondary storage device, a tertiary storage device, a non-linear storage device, and/or other like data storage devices. In some embodiments, IoT database 115 may be associated with one or more network elements that enable one or more clients (e.g., GW 124 or one or more servers 104) to query the IoT database 115 and/or store device information in or retrieve device information from the IoT database 115. Furthermore, IoT database 115 may include one or more virtual machines, such that the physical data storage devices containing the IoT database 115 may be logically divided into multiple virtual data storage devices and/or databases. Alternatively, the IoT database 115 may reside on one physical hardware data storage device.

The one or more servers 104 may include one or more systems and/or applications for providing one or more services to one or more clients (e.g., client device 105). In embodiments, the one or more servers 104 may include process control computers that are used to provide a human machine interface to operators of IoT devices 102. In various embodiments, the one or more servers 104 may include one or more processors, one or more memory devices and/or computer readable storage media, network interfaces, and/or other like components. Additionally, the one or more servers 104 may be a single physical hardware device, or may be physically or logically connected with other network devices. The servers 104 may be connected to, or otherwise associated with one or more data storage devices (not shown). The servers 104 may be any device capable of receiving and responding to requests from one or more client devices (e.g., client device 105 and/or IoT devices 102) across a computer network (e.g., cloud 100) to provide one or more services to the clients. The one or more servers 104 may include an operating system that may provide executable program instructions for the general administration and operation of one or more servers 104, and the computer-readable medium may store instructions that, when executed by the one or more processors of the servers 104, may allow the servers 104 to perform its intended functions. Suitable implementations for the operating system and general functionality of the servers 104 are known or commercially available, and are readily implemented by persons having ordinary skill in the art, particularly in light of the disclosure herein. Furthermore, it should be understood that the one or more servers 104 may not be required and the applications and software components discussed herein may be executed on any appropriate device or host machine.

In some embodiments, the one or more servers 104 may provide IoT device services that may utilize information obtained/recorded by various IoT devices 102. For example, the services provided by the one or more servers 104 may include security/safety services (e.g., video surveillance, burglary monitoring, fire/smoke monitoring, and the like); energy usage analytics and automation services (e.g., utility meter reading, analysis, and reporting); medical and/or athletic performance analytics and analysis; manufacturing and/or processing plant machinery/systems monitoring, and/or any other like services. The one or more servers 104 may obtain event based data from the IoT devices 102, analyze the event-based data, and may be able to generate content such as text, graphics, audio and/or video to be transferred to client device 105, via a web server (not shown) in the form of HTML, XML, ASP, MPEG-DASH, Java™, JSP, PHP, and/or any other appropriate structured language or server-side scripting language. The handling of requests and responses, (e.g., requests for information/content and the information/content provided in response) may be handled by the web server (not shown).

In FIG. 1C, only four IoT devices 102, one GW 124, one client device 105, and a single IoT database 115 are shown. According to various embodiments, any number of devices, any number of GWs, any number of client devices, any number of servers, and/or any number of databases may be present. Additionally, in some embodiments, the one or more servers 104 and/or one or more databases may be virtual machines, and/or they may be provided as part of a cloud computing service. In various embodiments, one or more servers 104 and one or more databases may reside on one physical hardware device, and/or may be otherwise fully integrated with one another. Thus, the depiction of the illustrative arrangement 30 in FIG. 1C should be taken as being illustrative in nature, and not limited to the scope of the disclosure.

Figure 2:
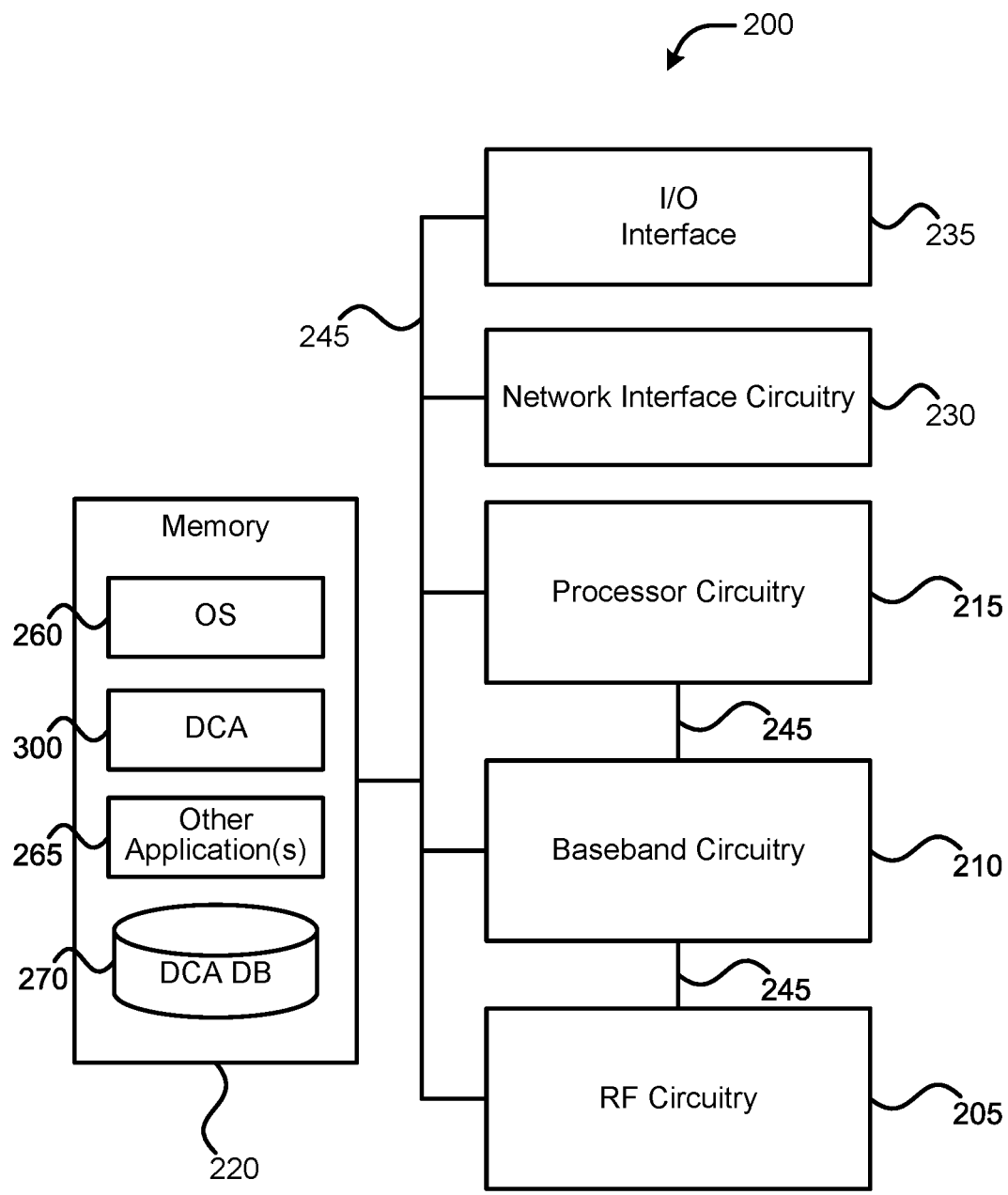
FIG. 2 illustrates the components of a computer device in accordance with various example embodiments.

FIG. FIG. 2 illustrates the components of a computer device 200, in accordance with various example embodiments. In embodiments, computer device 200 may comprise RF circuitry 205, baseband circuitry 210, processor circuitry 215, memory/storage 220, network interface circuitry (NIC) 230, and input/output (I/O) interface 235, coupled with each other by bus 245 at least as shown by FIG. 2.

Memory 220 may be a hardware device configured to store an operating system 260 and program code for one or more software components, such as dynamic channel allocation (DCA) application 300 (also referred to as "DCA application 300") and/or one or more other application(s) 265. Memory 220 may also store wireless communication protocol information (e.g., modulation schema, etc.) and channel information (e.g., interference signature, data rate, power/energy levels, etc.) in a dynamic channel allocation (DCA) database (DB) 270. Memory 220 may be a computer readable storage medium that may generally include a volatile memory (e.g., random access memory (RAM), synchronous dynamic RAM (SDRAM) devices, double-data rate synchronous dynamic RAM (DDR SDRAM) device, flash memory, and the like), non-volatile memory (e.g., read only memory (ROM), solid state storage (SSS), non-volatile RAM (NVRAM), and the like), and/or other like storage media capable of storing and recording data. Instructions, program code and/or software components may be loaded into memory 220 by one or more network elements via cloud 100 (e.g., from a remote provisioning service). The program code and/or software components may also be loaded from a separate computer readable storage medium into memory 220 using a drive mechanism (not shown). Such separate computer readable storage medium may include a memory card, memory stick, removable flash drive, sim card, a secure digital (SD) card, and/or other like computer readable storage medium (not shown). In some embodiments, software components may be loaded into memory 220 using over the air (OTA) interfaces using the RF circuitry 205, rather than via separate computer readable storage medium or drive mechanism.

During operation, memory 220 may include operating system 260, DCA application 300, and other application(s) 265. Operating system 260 may manage computer hardware and software resources and provide common services for computer programs. Operating system 260 may include one or more drivers that provide an interface to hardware devices thereby enabling operating system 260, DCA application 300, and other application(s) 265 to access hardware functions without needing to know the details of the hardware itself. The operating system 260 may be a general purpose operating system or an operating system specifically written for and tailored to the computer device 200.

DCA application 300 may be a collection of software logic and/or program code that enables the computer device 200 to operate according to the various example embodiments as discussed with regard to FIGS. 3-7. Other application(s) 265 may be a collection of software logic and/or program code that enables the computer device 200 to perform various function of the computer device 200. In embodiments, one of the other applications 265 may include a protocol translation/mapping application or protocol converter application that performs required protocol conversions for communications between the IoT devices 102 and a network element of cloud 100, or for communications between IoT devices 102 that operate according to different wireless communications protocols.

Processor circuitry 215 may be configured to carry out instructions of a computer program by performing the basic arithmetical, logical, and input/output operations of the system. The term "processor" as used herein refers to a physical central processing unit (CPU). The processor circuitry 215 may include a single-core processor, a dual-core processor, a triple-core processor, a quad-core processor, a graphics processing unit (GPU), etc. The processor circuitry 215 may perform a variety of functions for the computer device 200 and may process data by executing program code, one or more software logic, firmware, middleware, microcode, hardware description languages, and/or any other like set of instructions stored in the memory 220. The program code may be provided to processor circuitry 215 by memory 220 via bus 245, one or more drive mechanisms (not shown), and/or via RF circuitry 205. In order to perform the variety of functions and data processing operations, the program code and/or software components may be executed by the processor circuitry 215. On execution by the processor circuitry 215, the processor circuitry 215 may cause computer device 200 to perform the various operations and functions delineated by the program code.

For example, the DCA application 300 may include various logic configured to operate (through hardware and/or software) to perform functions in accordance with the example embodiments described herein. The various logical elements of the DCA application 300 may be loaded into the memory 220. The various logical elements may include interference logic; classification logic; selection logic; and communications interface logic (as discussed with regard to FIG. 3). Once the various logical elements of the DCA application 300 are loaded into memory 220 and executed by one or more processors of the processor circuitry 215, the one or more processors may be configured to cause computer device 200 to determine, based on a scan of a desired frequency spectrum, one or more available channels, wherein at least one available channel of the one or more available channels is associated with a different wireless communication protocol than a wireless communication protocol of another available channel of the one or more available channels; determine, for each of the one or more available channels, a corresponding interference signature; assign, to each of the one or more available channels, a rank based on the corresponding interference signature; select an available channel from among the one or more available channels based on assigned ranks; and transmit one or more data packets over the selected available channel in accordance with a wireless communication protocol associated with the selected available channel. While specific logical elements are described herein, it should be recognized that, in various embodiments, various logical elements may be combined, separated into separate logical elements, and/or omitted. Additionally, in various embodiments, one or more logical elements may be implemented on separate devices, in separate locations, or distributed, individually or in sets, across multiple processors, devices, locations, and/or in cloud-computing implementations.

Bus 245 may be configured to enable the communication and data transfer between processor circuitry 215 and memory 220. Bus 245 may comprise a high-speed serial bus, parallel bus, internal universal serial bus (USB), Front-Side-Bus (FSB), a PCI bus, a PCI-Express (PCI-e) bus, a Small Computer System Interface (SCSI) bus, an Inter-Integrated Circuit (I2C) bus, a universal asynchronous receiver/transmitter (UART) bus, and/or any other suitable communication technology for transferring data between components within computer device 200.

NIC 230 may be a computer hardware component that connects computer device 200 to a computer network, for example, network 135, via a wired connection. To this end, NIC 230 may include one or more dedicated processors and/or FPGAs to communicate using one or more wired communications protocol. The wired communications protocols may include a serial communications protocol (e.g., USB, FireWire, Serial Digital Interface (SDI), and/or other like serial communications protocols), a parallel communications protocol (e.g., IEEE 1284, Computer Automated Measurement And Control (CAMAC), and/or other like parallel communications protocols), and/or a network communications protocol (e.g., Ethernet, token ring, Fiber Distributed Data Interface (FDDI), and/or other like network communications protocols). The NIC 230 may also include one or more virtual network interfaces configured to operate with the one or more applications contained of the computer device 200.

I/O interface 235 may be a computer hardware component that provides communication between the computer device 200 and one or more other devices. The I/O interface 235 may include one or more user interfaces designed to enable user interaction with the computer device 200 and/or peripheral component interfaces designed to provide interaction between the computer device 200 and one or more peripheral components. User interfaces may include, but are not limited to a physical keyboard or keypad, a touchpad, a speaker, a microphone, etc. Peripheral component interfaces may include, but are not limited to, a non-volatile memory port, an audio jack, a power supply interface, a serial communications protocol (e.g., USB, FireWire, SDI, and/or other like serial communications protocols), a parallel communications protocol (e.g., IEEE 1284, CAMAC, and/or other like parallel communications protocols), etc.

The baseband circuitry 210 may include circuitry such as, but not limited to, one or more single-core or multi-core processors. These processor(s) may include one or more baseband processors that are dedicated to a particular wireless communication protocol. For example, the baseband circuitry 210 may include one or more baseband processors for communicating in accordance with GSM and/or EDGE; one or more baseband processors for communicating in accordance with UMTS and/or LTE/LTE Advanced (LTE-A) (including dedicated baseband processors for second generation (2G), third generation (3G), fourth generation (4G), etc.); one or more baseband processors for communicating in accordance with EVDO, one or more baseband processors for communicating in accordance with Wi-Fi and/or IEEE 802.11 standards; one or more baseband processors for communicating in accordance with IEEE 802.15.4-802.15.5 protocols including ZigBee, WirelessHART, 6LoWPAN, etc.; one or more baseband processors for communicating in accordance with WiMAX; one or more baseband processors for communicating in accordance with Bluetooth or BLE, and/or one or more baseband processors for communicating in accordance with any other wireless communication protocols, including RF-based, optical, and so forth. The baseband circuitry 210 (e.g., one or more of baseband processors) may handle various radio control functions that enable communication with one or more radio networks via the RF circuitry 205. The radio control functions may include, but are not limited to, signal modulation, encoding, decoding, radio frequency shifting, etc. In various embodiments, baseband circuitry 210 may include circuitry to operate with signals that are not strictly considered as being in a baseband frequency. For example, in some embodiments, baseband circuitry 210 may include circuitry to operate with signals having an intermediate frequency, which is between a baseband frequency and a radio frequency.

RF circuitry 205 may enable communication with wireless networks using modulated electromagnetic radiation through a non-solid medium. In various embodiments, the RF circuitry 205 may include switches, filters, amplifiers, etc. to facilitate the communication with one or more wireless networks. The RF circuitry 205 may be coupled with one or more antenna elements (not shown) to enable communication with one or more other devices. RF circuitry 205, as controlled by the baseband circuitry 210, may generate or otherwise produce radio waves to transmit data to one or more other devices via the one or more antenna elements. The RF circuitry 205 may be configured to receive and convert a signal from a modulated radio wave into usable information, such as digital data, which may be provided to one or more other components of computer device 200 via bus 245. In various embodiments, RF circuitry 205 may include circuitry to operate with signals that are not strictly considered as being in a radio frequency. For example, in some embodiments, RF circuitry 205 may include circuitry to operate with signals having an intermediate frequency, which is between a baseband frequency and a radio frequency. Furthermore, the RF circuitry 205 may be equipped with multiple radios operating in different spectrum bands. The RF circuitry 205 and the baseband circuitry 210 may be collectively referred to as "communications circuitry."

The components of computer device 200 may be implemented using any suitably configured hardware and/or software. For example, in some embodiments baseband circuitry 210, processor circuitry 215, and/or memory/storage 220, may be packaged together to form a single package or SoC, which in some embodiments may be implemented in GW 124. Additionally, although FIG. 2 illustrates various components of the computer device 200, in some embodiments, computer device 200 may include many more components than those shown in FIG. 2, however, it is not necessary to show and describe such components to illustrate the example embodiments.

Figure 3:
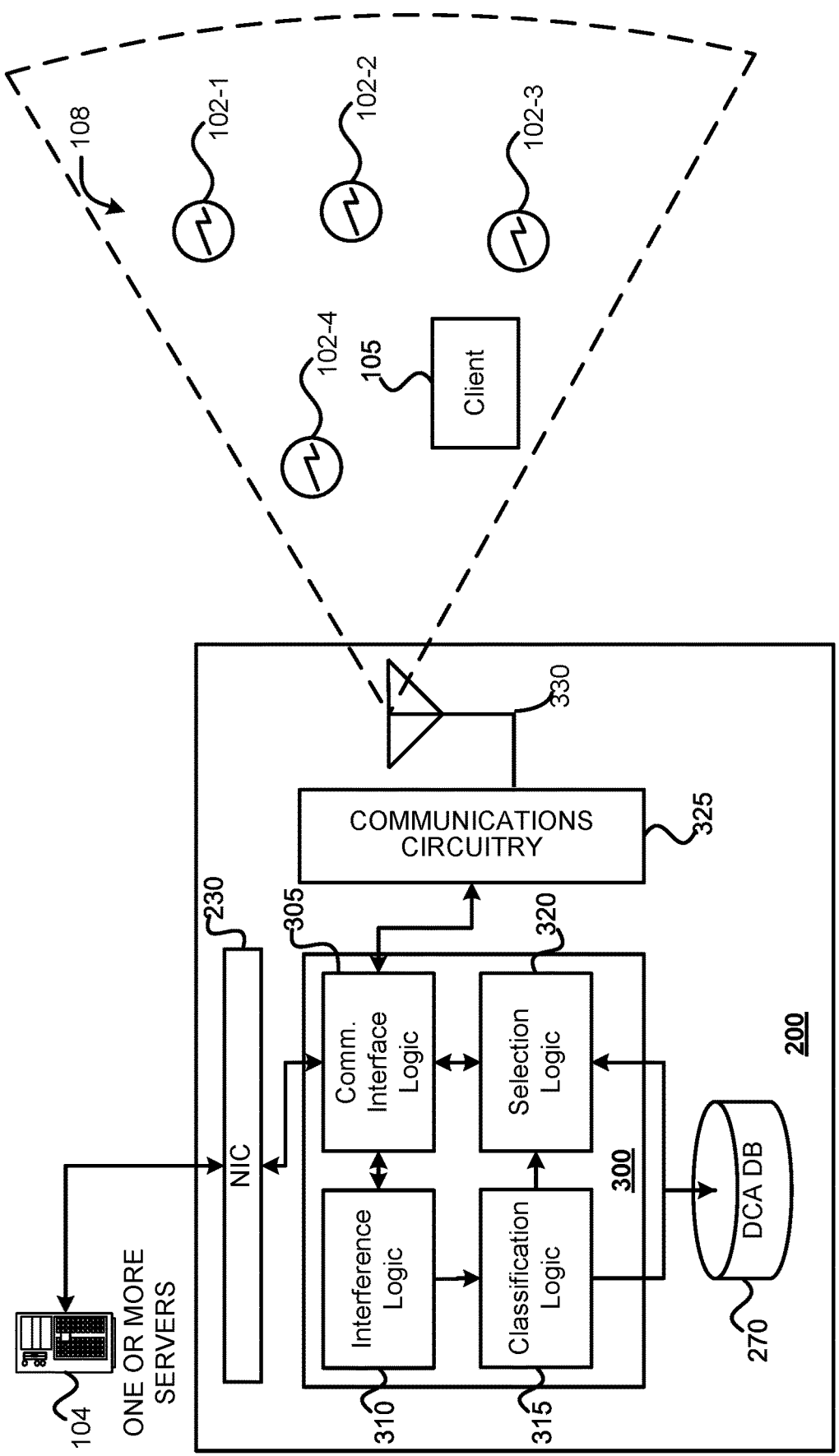
FIG. 3 illustrates example embodiments of logical components and interaction points between elements shown and described with regard to FIGS. 1-2.

FIG. 3 shows example logical components and interaction points between components/logic of DCA application 300, components of the computer device 200, and the elements of the arrangement 100, according to some embodiments. The DCA application 300 may include communications interface logic (CIL) 305, interference logic 310 (also referred to as an "interference determination logic"), classification logic 315, and selection logic 320. The elements shown by FIG. 3 may operate as follows.

CIL 305 may communicate data with the one or more servers 104 via NIC 230. This data may include providing IoT related data to the one or more servers 104, and receiving analyzed/processed IoT-related data from the one or more servers 104. The CIL 305 may also receive the IoT-related data from one or more IoT devices 102 via the communications circuitry 325, and may also provide the analyzed/processed IoT-related data to the client device 105. In some embodiments, the CIL 305 may receive the measurement data from the one or more IoT devices 102 and/or the client device 105 via the communications circuitry 325, which may be used for generating the interference signatures discussed infra.

In embodiments, CIL 305 may instruct the communications circuitry 325 (which may include the baseband circuitry 205 and the RF circuitry 210 discussed previously, and which may be coupled with antenna array 330) to perform a scan of the environment 108. An example of such as scan is depicted by the dashed lines in FIG. 3, and may be performed using known methods (e.g., sector level sweep (SLS), beaconing, channel sensing, etc.). The scan may be of an entire frequency spectrum (e.g., the entire industrial-scientific-medical (ISM) band including 6.7 MHz to 246 GHz, and the like) or a desired portion of the frequency spectrum (e.g., frequencies allocated to one or more of low-powered PANs, WiFi, and/or cellular communications including 2.4 GHz to 5.8 GHz, or frequencies in an unlicensed band such as a 60 GHz band and the like). The instruction may be received from the interference logic 310, or the CIL 305. The instruction may instruct the communications circuitry 325 to perform the scan of the environment 108 on a periodic basis or at a predetermined time interval. In other embodiments, the scan may be performed in a (substantially) continuous manner. The periodic or continuous monitoring of the environment 108 for any changes in the interference may be used to continuously adapt the dynamic channel allocation to cope with changing interference patterns. The CIL 305 may receive data indicative of the performed scan from the communications circuitry 325 and provide this data to the interference logic.

The interference logic 310 may receive the data indicative of the performed scan, and determine one or more available channels based on the scan of the desired frequency spectrum. The data indicative of the scan obtained from the CIL 205 may be measurement data/values, or information used by the interference logic 310 to determine the measurement data/values. In various embodiments, at least one available channel of the one or more available channels may be associated with a different wireless communication protocol than a wireless communication protocol of another available channel of the one or more available channels. For example, environment 108 may include a WiFi router that provides a WiFi network in the environment 108 (not shown), IoT devices 102-1 and 102-4 may communicate using the ZigBee protocol, IoT device 102-2 may communicate using WiFi signaling, and the IoT device 102-3 may communicate using BLE and Thread signaling. In this case, the interference logic 310 may determine one or more available channels in the environment 108 among the WiFi, ZigBee, BLE, and Thread networks. The interference logic 310 may also determine an aggressor network and one or more victim networks from among the available channels. An aggressor network may be a network or a set of available channels that cause interference with other available channels in the environment 108. A victim network may be a network or a set of available channels under interference by the set of channels of the aggressor network. Continuing with the previous example, the interference logic 310 may determine that the WiFi network is acting as an aggressor network while the ZigBee, BLE, and Thread networks are victim networks.

The interference logic 310 may also determine an interference signature for each of the one or more available channels. The interference signature may be a measurement or value, or a collection/aggregation of measurement values, that is/are indicative of an amount of interference experienced by each of the available channels due to, for example, co-channel interference or adjacent channel interference, or an amount of interference experienced by the GW 126, the IoT devices 102, and/or the client device 105 for each of the available channels. The channels may be measured by the computer device 200 (e.g., using the communications circuitry 325), or measured by another device and communicated back to the computer device 200. For example, when the computer device 200 is the GW 126, measurements may be collected by the IoT devices 102 and/or the client device 105 and report back to the GW 126. As examples, the measurements and/or the interference signatures may be, or may be based on an energy detection (ED) operation and/or one or more of the following measurements: bit error ratio (BER), Block Error Rate (BLER), signal-to-noise ratio (SNR), signal-to-interference (SIR) ratio or carrier-to-interference ratio, signal-to-interference-plus-noise ratio (SINR), signal-to-noise and distortion (SINAD) ratio, channel interference measurements, thermal noise power measurements, received interference power measurements, peak-to-average power ratio (PAPR), Reference Signal Received Power (RSRP), Received Signal Strength Indicator (RSSI), Reference Signal Received Quality (RSRQ), a Received Signal Strength Indicator (RSSI), received channel power indicator (RCPI), Global nevigation satellite system (GNSS) timing of cell frames for user equipment (UE) positioning for E-UTRAN or 5G/NR (e.g., a timing between a base station (e.g., GW 126) reference time and a GNSS-specific reference time for a given GNSS), GNSS code measurements (e.g., the GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), path loss, bandwidth (BW), network or cell load, latency, jitter, round trip time (RTT), number of interrupts, out-of-order delivery of data packets, transmission power, bit error rate, packet delay time, packet loss rate, packet reception rate (PRR), and/or other like measurements or information that may indicate a level or amount of traffic in a communications network. In embodiments where an available channel belongs to a cellular network (e.g., 3GPP LTE or 5G/NR), the measurements and/or interference signature could be based on RSRP, RSSI, and/or RSRQ measurements of cell-specific reference signals, channel state information reference signals (CSI-RS), and/or synchronization signals (SS) or SS blocks. In embodiments where an available channel belongs to a WLAN network (e.g., IEEE 802.11 or WiFi), the measurements and/or interference signature could be based on RSRP, RSSI, and/or RSRQ measurements of various beacon, FILS discovery frames, or probe response frames. Other measurements may be additionally or alternatively used, such as those discussed in 3GPP TS 36.214 v15.4.0, 3GPP TS 38.215, IEEE 802.11, Part 11: "Wireless LAN Medium Access Control (MAC) and Physical Layer (PHY) specifications, IEEE Std.", and/or the like.

In embodiments, the interference signature may be indicative of a type of interference experienced by an available channel. For example, the interference signature may indicate that an available channel is experiencing Additive White Gaussian Noise (AWGN), flat spectrum interference, bumpy spectrum interference, and the like. AWGN may be any random noise added to a signal or channel for all frequencies at a given power level. Flat spectrum interference may be any broadband interference that affects the channel under consideration at equal power in the channel's narrow band of operation, which may result in a reduction of a signal-to-noise ratio (SNR) of a channel and/or variations in the amplitude of the channel. Flat spectrum interference may occur in networks using an Orthogonal Frequency Division Multiplexing (OFDM) scheme such as LTE/LTE-A cellular networks and IEEE 802.11a, 802.11g, 802.11ac, 802.11d, and 802.11n networks. Bumpy spectrum interference may be any other interference that is not treated as AWGN. In some embodiments, bumpy spectrum interference may be interference having a non-uniform power distribution in the frequency band under consideration. Bumpy spectrum interference typically occur in networks using an offset quadrature phase-shift keying (OQPSK) and/or Direct-sequence Spread Spectrum (DSSS) scheme such as legacy IEEE 802.11 (e.g., WiFi) networks, IEEE 802.15.4 (e.g., ZigBee, 6LoWPAN, etc.) networks, and Code Division Multiple Access (CDMA) networks. However, other types of wireless networks could experience bumpy interference based on device implementations and/or deployment scenarios, for example. The interference logic 310 may then pass, to the classification logic 315, the interference signature of each available channel and the wireless communication protocol of each available channel.

The classification logic 315 may receive the interference signatures and wireless communication protocols from the interference logic 310, and may rank and classify each of the available channels based on the interference signatures. The available channels may be ranked/classified such that available channels experiencing lower amounts of interference are ranked/classified higher than available channels experiencing greater amounts of interference. In embodiments, the classification logic 315 may differentiate between channels belonging to an aggressor network from channels belonging to victim networks. In some embodiments, the channels belonging to victim networks may be ranked/classified while aggressor network channels may be unranked. In embodiments, the classification logic 315 may also assign a priority or "class" to each available channel (see e.g., FIG. 4). The classification logic 315 may also assign the rank to each available channel based on the assigned priority or class. The classification logic 315 may also rank/classify the available channels according to a data rate of each channel such that available channels with higher data rates are ranked higher than available channels with lower data rates. The classification of a channel as having a high data rate or a low data rate may be based on a threshold value that is a percentage of a maximum available data rate for a particular wireless communications protocol. For example, ZigBee channels may typically have a maximum data rate of 250 kbps, and a threshold may be defined as 50% of 250 kbps or 125 kbps where a ZigBee channel having a data rate greater than or equal to 125 kbps may be classified as having a high data rate while a ZigBee channel having a data rate below 125 kbps may be classified as having a low data rate. These threshold values may be based on design choice or one or more empirical studies. An example classification/ranking scheme for available channels is shown by FIG. 4.

FIG. 4 shows an example classification and/or ranking scheme for DCA, according to some embodiments. As shown by the table 400 of FIG. 4, channels where there is no interference, e.g., non-overlapping channels with the aggressor network may be classified as "Class 1", channels experiencing interference from the aggressor network can be considered as AWGN and operate with a relatively high data rate may be classified as "Class 2a", channels experiencing interference from the aggressor network can be considered as AWGN and operate with a relatively low data rate may be classified as "Class 2b", channels at an edge of flat spectrum interference and operate with a relatively high data rate may be classified as "Class 3 a", channels at the edge of flat spectrum interference and operate with a relatively low data rate may be classified as "Class 3b", channels operating in 'bumpy' spectrum of interference and operate with a relatively high data rate may be classified as "Class 3c", and channels operating in 'bumpy' spectrum of interference and operate with a relatively low data rate may be classified as "Class 3d". In embodiments, the classes illustrated by FIG. 4 may be applicable only to victim networks because aggressor networks typically do not experience interference from other networks. However, in some embodiments, channels belonging to an aggressor network may be given some classification or identifier to indicate that such channels should not be ranked, for example, by classified aggressor network channels with a "Class 0" or other like identifier. Table 400 is meant to be illustrative and other classification or ranking schemes may be used in other embodiments.

Referring back to FIG. 3, the classification logic 315 may store the available channels in the DCA DB 270. The DCA DB 270 may store each available channel in association with a corresponding wireless communication protocol, a modulation type/schema of the wireless communication protocol, a data rate of the channel/signal, and received RF power level and/or energy level of the channel/signal. In some embodiments, the DCA DB 270 may be populated based on the type of device that wishes to communicate over the available channel (e.g., client device 105 or IoT device 102). Example classification/rankings in the DCA DB 270 for available channels is shown by FIGS. 5-6.

FIG. 5 shows an example table 500 of entries in a DCA DB 270, according to various embodiments. As shown by table 500 of FIG. 5, available channels and their associated wireless communications protocols may be listed with associated interference signatures. The channel specific parameters may be parameters that are specific to an available channel. For example, table 500 shows a victim ZigBee network (e.g., entry 3) that is operating in an environment with two WLAN networks acting as aggressor networks (e.g., the IEEE 802.11b network listed in entry 1 and the IEEE 802.11n network listed in entry 2). The interference signatures for the WLAN networks are listed as "aggressor" to indicate that these networks are acting as aggressor networks. Further, table 500 also shows that each channel of the ZigBee network (e.g., channels 11-26) is available and also shows an interference signature for each available channel of the ZigBee network. As shown by table 500, channels 13-17 of the ZigBee network may have a direct overlap with the channels of the aggressor networks, channels 11-12 and 22-26 of the ZigBee network may have no overlap with the channels of the aggressor networks, and channels 14, 17 and 19-22 of the ZigBee network may be experiencing bumpy interference. In embodiments, the classification logic 315 may rank/classify channels of the ZigBee network according to their classifications and data rates as shown by FIG. 5.

FIG. 6 shows an example of entries in a DCA DB 270, according to some embodiments. As shown by table 600 of FIG. 6, available channels and their associated wireless communications protocols may be listed with associated interference signatures, channel specific parameters, and protocol specific parameters.

The protocol specific parameters may be parameters that are specific to the wireless communication protocol, such as protocol name, modulation schema, number of channels, bandwidth per channel, maximum power per channel, and a maximum data rate. For example, entry 3 of table 600 lists an available BLE channel according to channel specific parameters and protocol parameters. The protocol parameters for entry 3 may include the protocol name (e.g., BLE), a modulation schema (e.g., Gaussian frequency shift keying (GFSK) modulation), a number of channels (e.g., 40), a bandwidth per channel (e.g., 2 megahertz (MHz)), maximum power per channel (e.g., 10 milliwatts (mW)), and a maximum data rate (e.g., 1 megabits per second (Mbps)). The protocol specific parameters may be based on the highest achievable values that are theoretically possible for each wireless communication protocol. For example, entry 1 of table 600 may list 600 Mbps as the maximum data rate per channel of the IEEE 802.11n network, which may be a highest achievable data rate for a WiFi network using multiple input multiple output (MIMO) with four antenna elements that may allow four simultaneous 72.2 Mbps data streams with 20 MHz channels. Furthermore, the DCA DB 270 may also include other protocol parameters not shown by table 500, such as supported device types, network provider identifiers, and the like.

The channel specific parameters may be parameters that are specific to the available channel, such as the channel number of the available channel, a transmission power of the available channel, a data rate of the available channel, the interference signature of the available channel, and a classification/rank of the available channel. For example, entry 4 of table 600 lists channel specific parameters of the ZigBee channel, including a channel number of the available channel (e.g., 16), a transmission power of the available channel (e.g., 0.9 mW), a data rate of the available channel (e.g., 100 kilobits per second (kbps)), the interference signature of the available channel (e.g., AGWN; victim), and a classification/rank (e.g., 2a). Furthermore, the DCA DB 270 may also include other channel specific parameters not shown by table 600.

Additionally, the entries in the table 600 may vary based on device implementations, as well as protocol limitations and/or specifications. For example, entries 2-4 of table 600 show that the Thread and ZigBee networks may use OQPSK and/or DSSS as their modulation schemes. In some embodiments, the particular modulation scheme used may be based on the frequency spectrum in which these networks operate, which may also affect the data rate and channel bandwidths. By way of another example, entries 2 and 4 may use the same protocol (e.g., ZigBee) but may be associated with different network providers and/or different devices, and in some embodiments, the values in entries 2 and 4 may be altered to reflect the device type or network provider. Furthermore, the entries in the table 600 may vary based on jurisdictional or regulatory limitations. For example, entries 2 and 4 in table 600 show that the ZigBee networks have 16 channels each having 5 MHz of bandwidth and having a maximum data rate of 250 kbps per channel. These values may be based on the ZigBee channel operating in the 2.4 GHz band, which is typical for most jurisdictions outside of the United States. However, in the United States the ZigBee protocol is relegated to operating in the 915 MHz band, which may reduce the maximum data rate per channel to 40 kbps.

Referring back to FIG. 3, the selection logic 320 may select one of the available channels based on assigned classifications or ranks. In embodiments, the selection logic 320 may select a channel of a victim network having a highest rank among the available channels. In some embodiments, the selection logic may also implement a random selection procedure to select an available channel when more than one available channel have a same rank/classification. In such embodiments, using the random selection procedure, the selection logic 320 may randomly choose an available channel from the available channels having the same rank or classification. For example, referring to table 500 of FIG. 5, the selection logic 320 may select one of the channels 11-12 or 22-26 of the ZiggBee network at random since those channels have the greatest priority classification (e.g., Class 1).

In embodiments, the selection logic 320 determine, based on another scan of the selected available channel, whether any other channels associated with a same wireless communication protocol are operating on the selected available channel, and may select another available channel when another channel associated with the same wireless communication protocol is operating on the selected channel. For example, referring to table 600 of FIG. 6, the selection logic 320 may select the ZigBee channel 16 in entry 4 for a ZigBee-enabled IoT device 102 because ZigBee channel 16 has a highest classification/ranking among the ZigBee network entries in table 600 (e.g., class/rank 2a). In embodiments, the selection logic 320 may instruct the CIL 305 to perform an active scan in the selected channel to make sure that no other networks of the same wireless communication protocol are operating in that channel. For example, when the selection logic 320 selects ZigBee channel 16 based on the ranking/classification, and since the ZigBee protocol includes channels that 11-26 range from about 2.405 GHz to 2.480 GHz, the selection logic 320 may instruct the CIL 305 to perform an active scan of ZigBee networks operating in or around 2.430 GHz to determine whether any other ZigBee networks are operating in ZigBee channel 16. If the CIL 305 determines that no other ZigBee networks are operating in ZigBee channel 16, then the CIL 305 may control transmission of an instruction to a ZigBee-enabled IoT device 102 (e.g., IoT devices 102-1 or 102-4 discussed with regard to FIG. 1C) that the ZigBee-enabled IoT device 102 may transmit or receive data packets using ZigBee channel 16. In some embodiments, the CIL 305 may control transmission of data packets that were previously received from a ZigBee-enabled IoT device 102 (e.g., IoT device 102-1) to another ZigBee-enabled IoT device 102 (e.g., IoT device 102-4) using ZigBee channel 16. The CIL 305 may also provide the selection logic 320 with a result of the additional scan, and the selection logic 320 may store the results in the DCA DB 270. If the CIL 305 determines that another ZigBee network is operating in ZigBee channel 16, then the CIL 305 may notify the selection logic 320 of this determination, and the selection logic 320 may select another available channel having a next highest ranking/classification, such as ZigBee channel 18 listed in entry 2 of table 600. In some embodiments, the selection logic 320 may also select the Thread channel 12 if the receiving device is capable of communicating in accordance with that wireless communications protocol. The aforementioned operations may be repeated until a selected available channel is determined to be opened.

Figure 7:
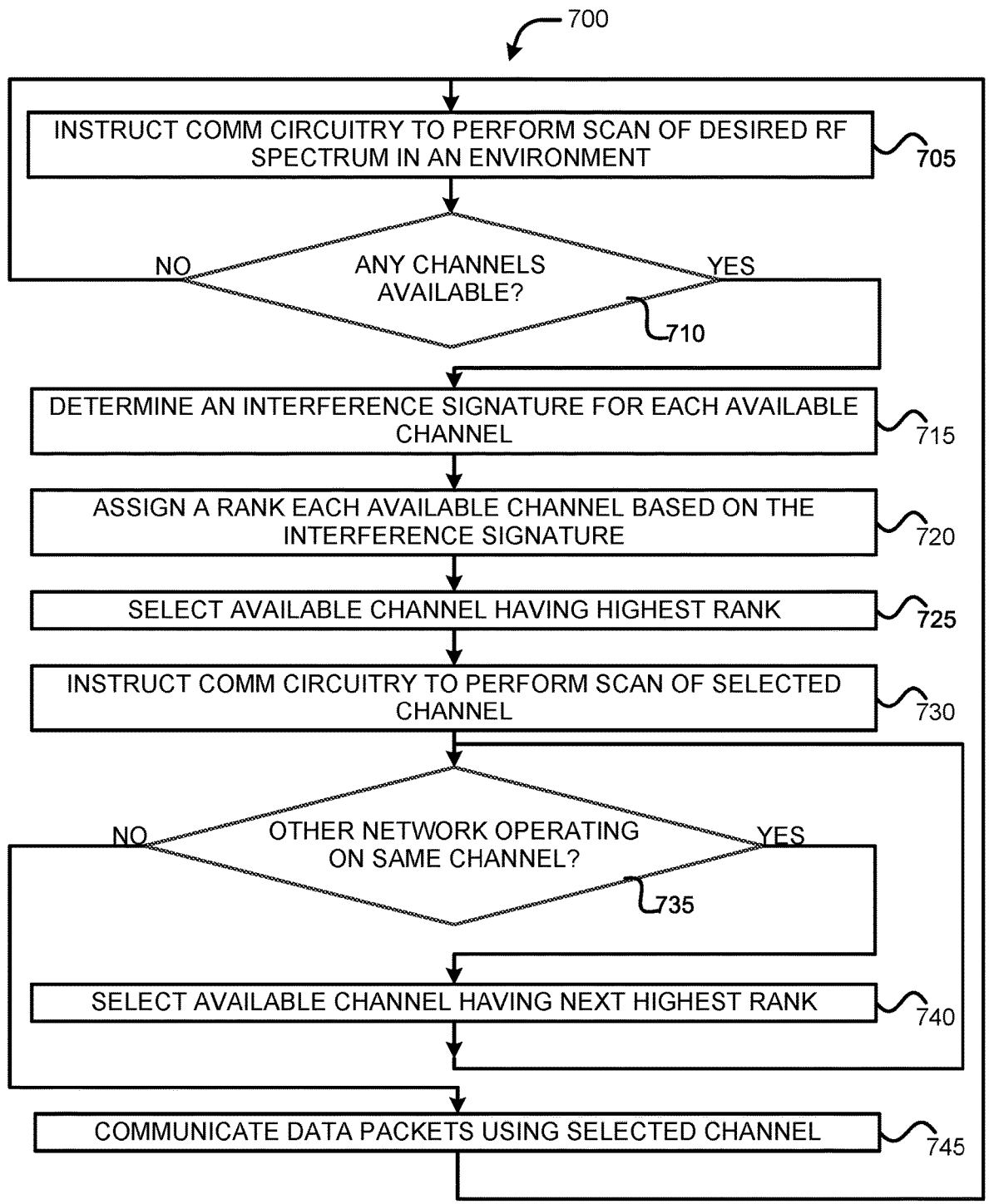
FIG. 7 illustrates an example process for dynamic channel allocation in accordance with various embodiments.

FIG. 7 is a flowchart illustrating an example process 700 of the DCA application 300, in accordance with various embodiments. For illustrative purposes, the operations of process 700 will be described as being performed by computer device 200 of FIGS. 2-3 in conjunction with the elements of FIG. 1. The operations described correspond to the algorithmic logic of the described logic performing the operations. However, it should be noted that other computing devices may operate the process 700 in a multitude of arrangements and/or environments. While particular examples and orders of operations are illustrated in FIG. 7, in various embodiments, these operations may be re-ordered, separated into additional operations, combined, or omitted altogether.

Referring to FIG. 7, at operation 705, the computer device 200 (e.g., via interference logic 310) may instruct communications circuitry 325 to perform a scan of a desired RF spectrum in environment 108. At operation 710, the computer device 200 may determine whether there are any available channels in the desired RF spectrum. If the computer device 200 determines that there are no available channels in the desired RF spectrum, then the computer device 200 may proceed back to operation 705 to perform another scan of the desired RF spectrum. In embodiments, the computer device 200 may wait for a predetermined period of time before performing the new scan, or the computer device 200 may perform the scan on a periodic basis or at a desired interval regardless of whether an available channel is found at operation 710. If the computer device 200 determines that there are one or more available channels in the desired RF spectrum, then the computer device 200 may proceed to operation 715 to determine an interference signature for each of the available channels.

At operation 715, the computer device 200 (e.g., through interference logic 310) may determine an interference signature for each of the available channels. The interference signature may be based on an amount of interference being experienced by an available channel or a type of interference being experienced by an available channel. At operation 620, the computer device 200 (e.g., through classification logic 315) may assign a rank to each of the available channels based on their corresponding interference signature. In embodiments, the computer device 200 may store each available channel in association with an associated wireless communication protocol, the corresponding interference signature, and ranking.

At operation 725, the computer device 200 (e.g., through selection logic 320) may select an available channel having a highest or greatest rank. At operation 730, the computer device 200 may instruct communications circuitry 325 to perform a scan of the selected channel. At operation 735, the computer device 200 may determine whether any other networks of the same wireless communication protocol as the selected channel are operating in the selected channel. If the computer device 200 determines that another network of the same wireless communication protocol is operating in the selected channel, then the computer device 200 may proceed to operation 740 to select another channel having a next highest rank. Once selected, the computer device 200 may proceed back to operation 735 to determine whether any other networks of the same wireless communication protocol as the other selected channel are operating in the other selected channel.

If at operation 735 the computer device 200 determines that no other networks of the same wireless communication protocol are operating in the selected channel, then the computer device 200 may proceed to operation 745 to communicate data packets using the selected channel. In embodiments, the computer device 200 may transmit or receive data packets using the selected channel on behalf of the device. For example, the computer device 200 may have received one or more data packets from one of the IoT devices 102 prior to or during operation of process 700. At operation 745, the computer device 200 may transmit the one or more data packets to the client device 105 or another IoT device 102. Prior to transmission, the computer device 200 may translate the one or more data packets into a format specified by the wireless communication protocol of the selected channel if the intended recipient is not enabled to communicate in accordance with such a protocol. In some embodiments, the computer device 200 may instruct a device to transmit or receive data packets using the selected channel. For example, the computer device 200 may have received a request message from one of the IoT devices 102 prior to or during operation of process 700. The request message may include a request to establish a network connection with another IoT device 102 or the client device 105. At operation 745, the computer device 200 (e.g., through communication interface logic 305) may transmit an instruction to the IoT device 102 indicating that the IoT device 102 may establish the network connection with the client device 105 or the other IoT device 102 over the selected channel.

Once the data packets are communicated, the computer device 200 may proceed back to operation 705 to perform the scan of the desired RF spectrum. In embodiments, process 700 may continuously or periodically repeat to update the interference signatures and dynamically allocate channels for multiple wireless communications protocols.

Some non-limiting Examples are provided below.

Example 1 may include a computer device comprising: one or more processors, coupled with a memory and radio frequency (RF) circuitry, wherein the one or more processors are to operate: classification logic to assign a rank to each of a plurality of available channels, wherein the classification logic is to assign ranks based on corresponding interference signatures of the plurality of available channels, wherein at least one available channel of the plurality of available channels is associated with a different wireless communication protocol than a wireless communication protocol of another available channel of the plurality of available channels; selection logic to select an available channel from among the plurality of available channels, wherein the selection logic is to select an available channel based on assigned ranks; and communications interface logic to control transmission of a data packet to another computer device in accordance with a wireless communication protocol associated with the selected available channel, wherein the data packet is to instruct the other computer device to transmit over the selected available channel.

Example 2 may include the computer device of example 1, further comprising: interference logic to be operated by the one or more processors to determine the plurality of available channels, wherein the interference logic is to determine the plurality of available channels based on a scan of a desired frequency spectrum and a corresponding interference signature for each of the plurality of available channels.

Example 3 may include the computer device of example 2, wherein the interference logic is to: determine, from among the plurality of available channels, an aggressor network and one or more victim networks, wherein the aggressor network comprises a set of the plurality of available channels that cause interference with other ones of the plurality of available channels, and wherein each of the one or more victim networks comprise a set of the plurality of available channels under interference by the set of the plurality of available channels of the aggressor network.

Example 4 may include the computer device of example 3, wherein the classification logic is further to: classify the set of the plurality of available channels of the one or more victim networks according to a type of interference caused by the aggressor network.

Example 5 may include the computer device of example 4, wherein to classify the set of the plurality of available channels of the one or more victim networks, the classification logic is to: assign a first priority to the plurality of available channels that do not overlap with an available channel of the aggressor network; assign a second priority to the plurality of available channels with experience of Additive White Gaussian Noise (AWGN) interference from an available channel of the aggressor network; assign a third priority to the plurality of available channels with experience of flat spectrum interference from an available channel of the aggressor network; and assign a fourth priority to the plurality of available channels with experience of bumpy spectrum interference from an available channel of the aggressor network, and wherein the first priority is greater than the second priority, the second priority is greater than the third priority, and the third priority is greater than the fourth priority.

Example 6 may include the computer device of example 5, wherein the classification logic is to assign the rank to each of the plurality of available channels based on an assigned priority of each of the plurality of available channels, and wherein the classification logic is to further rank each of the plurality of available channels according an associated data rate.

Example 7 may include the computer device of example 6, wherein the selection logic is further to implement a random selection procedure to select the available channel when the plurality of available channels includes at least two available channels with a same rank, wherein implementation of the random selection procedure is to randomly choose an available channel from among the at least two available channels with the same rank.

Example 8 may include the computer device of example 2, wherein: the interference logic is to determine whether any other channels associated with a same wireless communication protocol are operating on the selected available channel based on another scan of the selected available channel; the selection logic is to select another available channel when at least one other channel associated with a same wireless communication protocol is operating on the selected available channel; and the communications interface logic is to control transmission of the data packet when no other channels associated with a same wireless communication protocol are operating on the selected available channel.

Example 9 may include the computer device of example 1, wherein the interference logic is to determine the interference signature is based on an energy detection (ED) operation or a Received Signal Strength Indicator (RSSI).

Example 10 may include the computer device of example 1, wherein the classification logic and/or the selection logic is further to: store, in a dynamic channel allocation (DCA) database (DB), each available channel of the plurality of available channels; and store, in the DCA DB, a corresponding wireless communication protocol used by each available channel of the plurality of available channels, wherein corresponding wireless communication protocol used by each available channel includes a radio frequency (RF) power level, a data rate, and a modulation schema.

Example 11 may include the computer device of example 1, wherein the communications interface logic is to: control, at a predetermined interval, scans of the desired frequency spectrum and determine the corresponding interference signature for each available channel based on each performed scan.

Example 12 may include the computer device of examples 1-11, wherein the computer device is a system on chip (SoC) including the one or more processors and the memory, and wherein the SoC is implemented in a wireless gateway, an Internet of Things (IoT) gateway, a wireless access point, a base station, a radio beacon, a smart phone, a tablet personal computer (PC), a laptop PC, a desktop PC, or a wearable computer device.

Example 13 may include the computer device of example 12, wherein the one or more wireless communication protocols comprise at least two of Fifth Generation (5G) or New Radio (NR), Long Term Evolution (LTE); Universal Mobile Telecommunications System (UMTS); Global System for Mobile Communications (GSM); Enhanced Data GSM Environment (EDGE); an Institute of Electrical and Electronics Engineers (IEEE) 802.11 protocol (WiFi); an IEEE 802.16 protocol (Wi-MAX), one or more IEEE 802.15.4 based protocols; Bluetooth or Bluetooth Low Energy (BLE) protocols; ANT protocol; 3GPP device-to-device (D2D) or Proximity Services (ProSe) protocols; Z-Wave protocol; SigFox protocol; Platanus protocol; or Universal Plug and Play (UPnP).

Example 14 may include one or more computer readable media including instructions, which when executed by one or more processors of a computer device, cause the computer device to: assign a rank to each available channel of a plurality of available channels, wherein assignment of the ranks is based on corresponding interference signatures of the plurality of available channels, and wherein at least one available channel of the plurality of available channels is associated with a different wireless communication protocol than a wireless communication protocol of another available channel of the plurality of available channels; select an available channel from among the plurality of available channels based on assigned ranks; and transmit one or more data packets over the selected available channel in accordance with a wireless communication protocol associated with the selected available channel. The computer readable media may be a non-transitory computer-readable media.

Example 15 may include the one or more computer readable media of example 14, wherein execution of the instructions cause the computer device to: determine the plurality of available channels, wherein the determination of the plurality of available channels is based on a scan of a desired frequency spectrum; and determine a corresponding interference signature for each available channel of the one or more available channels.

Example 16 may include the one or more computer readable media of example 15, wherein the corresponding interference signature is indicative of an amount of interference experienced by each of the plurality of available channels.

Example 17 may include the one or more computer readable media of example 16, wherein to assign the rank to each of the plurality of available channels, execution of the instructions cause the computer device to: assign, to each of the plurality of available channels, the rank such that available channels with a lower amount of interference are ranked higher than channels with a greater amount of interference.

Example 18 may include the one or more computer readable media of example 12, wherein execution of the instructions cause the computer device to: store, in a dynamic channel allocation (DCA) database (DB), each available channel of the plurality of available channels; and store, in the DCA DB, a corresponding wireless communication protocol used by each available channel of the plurality of available channels, wherein corresponding wireless communication protocol used by each available channel includes a radio frequency (RF) power level, a data rate, and a modulation schema.

Example 19 may include the one or more computer readable media of example 12, wherein execution of the instructions cause the computer device to: determine, from among the plurality of available channels, an aggressor network and one or more victim networks, wherein the aggressor network comprises a set of the plurality of available channels that cause interference with other ones of the plurality of available channels, and wherein each of the one or more victim networks comprise a set of the plurality of available channels under interference by the set of the plurality of available channels of the aggressor network, and classify the set of the plurality of available channels of the one or more victim networks according to a type of interference caused by the aggressor network.

Example 20 may include the one or more computer readable media of example 17, wherein each of the plurality of available channels are further ranked according an associated data rate.

Example 21 may include the one or more computer readable media of example 14, wherein execution of the instructions cause the computer device to: determine, based on another scan of the selected available channel, whether any other channels associated with a same wireless communication protocol are operating on the selected available channel; and select another available channel when at least one other channel associated with a same wireless communication protocol is operating on the selected available channel.

Example 22 may include the one or more computer readable media of example 15, wherein execution of the instructions cause the computer device to: scan, at a predetermined interval, the desired frequency spectrum and determine the corresponding interference signature for each available channel based on the scan.

Example 23 may include the one or more computer readable media of examples 14-22, wherein the computer device, including the one or more processors, is implemented in a system on chip (SoC), wherein the SoC is implemented in a wireless gateway, an Internet of Things (IoT) gateway, a wireless access point, a base station, a radio beacon, a smart phone, a tablet personal computer (PC), a laptop PC, a desktop PC, or a wearable computer device, and wherein the one or more wireless communication protocols comprise at least two of Fifth Generation (5G) or New Radio (NR), Long Term Evolution (LTE); Universal Mobile Telecommunications System (UMTS); Global System for Mobile Communications (GSM); Enhanced Data GSM Environment (EDGE); an Institute of Electrical and Electronics Engineers (IEEE) 802.11 protocol (WiFi); an IEEE 802.16 protocol (Wi-MAX), one or more IEEE 802.15.4 based protocols; Bluetooth or Bluetooth Low Energy (BLE) protocols; ANT protocol; LTE device-to-device (D2D) or Proximity Services (ProSe) protocols; Z-Wave protocol; SigFox protocol; Platanus protocol; and/or Universal Plug and Play (UPnP).

Example 24 may include a computer-implemented method for dynamic allocation of channels of a desired frequency spectrum, the method comprising: determining, by a computer device, based on a scan of the desired frequency spectrum, plurality of available channels, wherein at least one available channel of the plurality of available channels is associated with a different wireless communication protocol than a wireless communication protocol of another available channel of the plurality of available channels; determining, by the computer device, a corresponding interference signature for each of the plurality of available channels; assigning, by the computer device, a rank based on the corresponding interference signature to each of the plurality of available channels; selecting, by the computer device, an available channel from among the plurality of available channels based on assigned ranks; and transmitting, by the computer device, one or more data packets over the selected available channel in accordance with a wireless communication protocol associated with the selected available channel.

Example 25 may include the method of example 21, wherein the corresponding interference signature is indicative of an amount of interference experienced by each of the plurality of available channels.

Example 26 may include the method of example 22, wherein assigning the rank to each of the plurality of available channels comprises: assigning, by the computer device to each of the plurality of available channels, the rank such that available channels with a lower amount of interference are ranked higher than channels with a greater amount of interference.

Example 27 may include the method of example 23, further comprising: ranking, by the computer device, each of the plurality of available channels according an associated data rate.

Example 28 may include the method of example 21, further comprising: determining, by the computer device based on another scan of the selected available channel, whether any other channels associated with a same wireless communication protocol are operating on the selected available channel; and selecting, by the computer device, another available channel when at least one other channel associated with a same wireless communication protocol is operating on the selected available channel.

Example 29 may include the method of example 21, further comprising: scanning, by the computer device at a predetermined interval, the desired frequency spectrum and determine the corresponding interference signature for each available channel based on each scan.

Example 30 may include the method of example 24, wherein determining the interference signature is based on an energy detection (ED) operation or a Received Signal Strength Indicator (RSSI).

Example 31 may include the method of examples 24-30, wherein the method is performed by a computer device implemented in a system on chip (SoC), wherein the SoC is implemented in a wireless gateway, an Internet of Things (IoT) gateway, a wireless access point, a base station, a radio beacon, a smart phone, a tablet personal computer (PC), a laptop PC, a desktop PC, or a wearable computer device, and wherein the one or more wireless communication protocols comprise at least two of Fifth Generation (5G) or New Radio (NR), Long Term Evolution (LTE); Universal Mobile Telecommunications System (UMTS); Global System for Mobile Communications (GSM); Enhanced Data GSM Environment (EDGE); an Institute of Electrical and Electronics Engineers (IEEE) 802.11 protocol (WiFi); an IEEE 802.16 protocol (Wi-MAX), one or more IEEE 802.15.4 based protocols; Bluetooth or Bluetooth Low Energy (BLE) protocols; ANT protocol; LTE device-to-device (D2D) or Proximity Services (ProSe) protocols; Z-Wave protocol; SigFox protocol; Platanus protocol; and/or Universal Plug and Play (UPnP).

Example 32 may include one or more computer-readable media including instructions, which when executed by one or more processors of a computer device, cause the computer device to perform the method of examples 24-30. The computer readable media may be a non-transitory computer-readable media.

Example 33 may include a computer device comprising: classification means for assigning a rank to each of a plurality of available channels, wherein the classification means is for assigning ranks based on corresponding interference signatures of the plurality of available channels, wherein at least one available channel of the plurality of available channels is associated with a different wireless communication protocol than a wireless communication protocol of another available channel of the plurality of available channels; selection means for selecting an available channel from among the plurality of available channels, wherein the selection means is for selecting an available channel based on assigned ranks; and communications means for transmitting data packet to another computer device, wherein the data packet is to instruct the other computer device to transmit over the selected available channel, wherein the communications means is further for transmitting the data packet in accordance with a wireless communication protocol associated with the selected available channel.

Example 34 may include the computer device of example 33, further comprising: interference determination means for determining the plurality of available channels, wherein the interference determination means for determining the plurality of available channels based on a scan of a desired frequency spectrum and a corresponding interference signature for each of the plurality of available channels.

Example 35 may include the computer device of example 34, wherein the interference determination means is for: determining, from among the plurality of available channels, an aggressor network and one or more victim networks, wherein the aggressor network comprises a set of the plurality of available channels that cause interference with other ones of the plurality of available channels, and wherein each of the one or more victim networks comprise a set of the plurality of available channels under interference by the set of the plurality of available channels of the aggressor network.

Example 36 may include the computer device of example 35, wherein the classification means is further for: classifying the set of the plurality of available channels of the one or more victim networks according to a type of interference caused by the aggressor network.

Example 37 may include the computer device of example 36, wherein to classify the set of the plurality of available channels of the one or more victim networks, the classification means is for: assigning a first priority to the plurality of available channels that do not overlap with an available channel of the aggressor network; assigning a second priority to the plurality of available channels with experience of Additive White Gaussian Noise (AWGN) interference from an available channel of the aggressor network; assigning a third priority to the plurality of available channels with experience of flat spectrum interference from an available channel of the aggressor network; and assigning a fourth priority to the plurality of available channels with experience of bumpy spectrum interference from an available channel of the aggressor network, and wherein the first priority is greater than the second priority, the second priority is greater than the third priority, and the third priority is greater than the fourth priority.

Example 38 may include the computer device of example 37, wherein the classification means is for assigning the rank to each of the plurality of available channels based on an assigned priority of each of the plurality of available channels, and wherein the classification means is further for ranking each of the plurality of available channels according an associated data rate.

Example 39 may include the computer device of example 38, wherein the selection means is further for implementing a random selection procedure to select the available channel when the plurality of available channels includes at least two available channels with a same rank, wherein implementation of the random selection procedure is to randomly choose an available channel from among the at least two available channels with the same rank.

Example 40 may include the computer device of example 34, wherein: the interference determination means is for determining whether any other channels associated with a same wireless communication protocol are operating on the selected available channel based on another scan of the selected available channel; the selection means is for selecting another available channel when at least one other channel associated with a same wireless communication protocol is operating on the selected available channel; and the communications means is for transmitting the data packet when no other channels associated with a same wireless communication protocol are operating on the selected available channel.

Example 41 may include the computer device of example 33, wherein the interference determination means is for determining the interference signature is based on an energy detection (ED) operation or a Received Signal Strength Indicator (RSSI).

Example 42 may include the computer device of example 33, wherein the classification means and/or the selection means is further for: storing, in a dynamic channel allocation (DCA) database (DB), each available channel of the plurality of available channels; and storing, in the DCA DB, a corresponding wireless communication protocol used by each available channel of the plurality of available channels, wherein corresponding wireless communication protocol used by each available channel includes a radio frequency (RF) power level, a data rate, and a modulation schema.

Example 43 may include the computer device of example 33, wherein the communications means is for: scanning, at a predetermined interval, the desired frequency spectrum and for determining the corresponding interference signature for each available channel based on each performed scan.

Example 44 may include the computer device of examples 33-43, wherein the computer device is implemented in a system on chip (SoC), wherein the SoC is implemented in a wireless gateway, an Internet of Things (IoT) gateway, a wireless access point, a base station, a radio beacon, a smart phone, a tablet personal computer (PC), a laptop PC, a desktop PC, or a wearable computer device, and wherein the one or more wireless communication protocols comprise at least two of Fifth Generation (5G) or New Radio (NR), Long Term Evolution (LTE); Universal Mobile Telecommunications System (UMTS); Global System for Mobile Communications (GSM); Enhanced Data GSM Environment (EDGE); an Institute of Electrical and Electronics Engineers (IEEE) 802.11 protocol (WiFi); an IEEE 802.16 protocol (Wi-MAX), one or more IEEE 802.15.4 based protocols; Bluetooth or Bluetooth Low Energy (BLE) protocols; ANT protocol; LTE device-to-device (D2D) or Proximity Services (ProSe) protocols; Z-Wave protocol; SigFox protocol; Platanus protocol; and/or Universal Plug and Play (UPnP).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed:

1. One or more non-transitory computer readable media (NTCRM) comprising instructions, wherein execution of the instructions by one or more processors of a smallcell base station (SBS) is to cause the SBS to:
   identify one or more connected devices to schedule respective transmissions;
   determine interference values for a set of available channels, wherein the interference values are based on measurements of the set of available channels;
   assign ranks to the set of available channels based on the interference values;
   store the assigned ranks in a channel priority table;
   assign available channels of the set of available channels to corresponding connected devices of the one or more connected devices based on the assigned ranks stored in the channel priority table; and
   instruct the corresponding connected devices to transmit or receive signaling in the assigned available channels.

2. The one or more NTCRM of claim 1, wherein at least one available channel of the set of available channels is associated with a wireless communication protocol that is different than a wireless communication protocol of another available channel of the set of available channels.

3. The one or more NTCRM of claim 1, wherein one or more available channels of the set of available channels are $3^{rd}$ Generation Partnership Project (3GPP) Long Term Evolution (LTE) channels and one or more other available channels of the set of available channels are Institute of Electrical and Electronics Engineers (IEEE) 802.11 protocol (WiFi) channels.

4. The one or more NTCRM of claim 1, wherein execution of the instructions is to cause the SBS to:
   determine the set of available channels based on a scan of a desired frequency spectrum.

5. The one or more NTCRM of claim 4, wherein execution of the instructions is to cause the SBS to:
   determine signal strength measurements or pathloss measurements from the scan of the desired frequency spectrum; and
   determine the set of available channels based on the determined signal strength measurements or pathloss measurements.

6. The one or more NTCRM of claim 1, wherein, to assign the ranks to the set of available channels, execution of the instructions is to cause the SBS to:

assign the ranks to the set of available channels such that available channels with a lower amount of interference are ranked higher than available channels with a greater amount of interference.

7. The one or more NTCRM of claim 6, wherein, to assign the available channels to the corresponding connected devices, execution of the instructions is to cause the SBS to:
assign available channels from among the set of available of channels to respective ones of the one or more devices based on the assigned ranks.

8. The one or more NTCRM of claim 7, wherein, to assign the available channels to the corresponding connected devices, execution of the instructions is further to cause the SBS to:
assign the available channels to the corresponding connected devices further based on a priority associated with each channel.

9. The one or more NTCRM of claim 1, wherein, to assign the available channels to the corresponding connected devices, execution of the instructions is to cause the SBS to:
assign the available channels to the corresponding connected devices further based on a data rate associated with each channel.

10. The one or more NTCRM of claim 1, wherein at least one device of the one or more connected devices is an Internet of Things (loT) device or a client computing device.

11. The one or more NTCRM of claim 1, wherein execution of the instructions is to cause the SBS to:
receive data packets from the one or more connected devices in the assigned available channels; and
send the received data packets to a server over a wired or wireless network connection.

12. A base station (BS) comprising:
radiofrequency (RF) circuitry arranged to signal channel assignments to respective connected devices, the channel assignments indicating assigned available channels in which the respective connected devices are to transmit or receive signaling; and
processor circuitry coupled with the RF circuitry, the processor circuitry arranged to:
identify the connected devices;
determine an amount of interference for a set of available channels based on RF measurements of the set of available channels;
rank the set of available channels based on the amount of interference for the set of available channels;
store the ranks in a channel priority table; and
determine the channel assignments for the respective connected devices based on the ranks stored in the channel priority table.

13. The BS of claim 12, wherein at least one available channel of the set of available channels is associated with a wireless communication protocol that is different than a wireless communication protocol of another available channel of the set of available channels.

14. The BS of claim 12, wherein:
the RF circuitry is arranged to perform a scan of a desired frequency spectrum; and
the processor circuitry is arranged to determine the set of available channels based on the scan.

15. The BS of claim 14, wherein the processor circuitry is arranged to:
determine signal strength measurements or pathloss measurements based on the scan; and
identify the set of available channels based on the determined signal strength measurements or pathloss measurements.

16. The BS of claim 12, wherein, to rank the set of available channels, the processor circuitry is arranged to:
assign respective ranks to the set of available channels in descending order according to the amount of interference experienced by each of the set of available channels.

17. The BS of claim 16, wherein, to determine the channel assignments, the processor circuitry is arranged to:
assign individual available channels from the set of available channels to the respective connected devices based on the assigned ranks.

18. The BS of claim 12, wherein, to determine the channel assignments, the processor circuitry is arranged to:
assign individual available channels from the set of available channels to the respective connected devices based on a priority of the individual available channels.

19. The BS of claim 12, wherein, to determine the channel assignments, the processor circuitry is arranged to:
assign individual available channels from the set of available channels to the respective connected devices based on a data rate of the individual available channels.

20. The BS of claim 12, wherein the connected devices include an Internet of Things (loT) device or a client computing device.

21. The BS of claim 12, further comprising:
network interface circuitry coupled with the processor circuitry, the network interface circuitry is arranged to send data packets to a server over a network connection, and
wherein the RF circuitry is arranged to receive the data packets from the connected devices in the assigned available channels.

22. A dynamic channel allocation (DCA) method, comprising:
identifying, by a smallcell base station (SBS), one or more connected devices to schedule respective transmissions;
determining, by the SBS, interference signatures for a set of available channels, wherein the interference signatures indicate an amount of interference experienced by a corresponding one of the set of available channels based on measurements of the set of available channels;
assigning, by the SBS, ranks to the corresponding ones of the set of available channels based on the interference signatures;
storing, by the SBS, the assigned ranks in a DCA database;
assigning, by the SBS, available channels of the set of available channels to corresponding connected devices of the one or more connected devices based on the assigned ranks stored in the DCA database; and
transmitting, by the SBS, channel assignments to respective connected devices, channel assignments indicating the assigned available channels in which the respective connected devices are to transmit or receive signaling.

23. The DCA method of claim 22, further comprising:
determining, by the SBS, signal strength measurements or pathloss measurements; and
identifying, by the SBS, the available channels based on the determined signal strength measurements or pathloss measurements.

24. The DCA method of claim 23, further comprising:
performing, by the SBS, the signal strength measurements or the pathloss measurements, or
receiving, by the SBS, the signal strength measurements or the pathloss measurements from the respective connected devices.

25. The DCA method of claim 23, wherein the SBS is arranged to:
   receiving, by the SBS, data packets from the respective connected devices;
   sending, by the SBS via a core network, the received data packets to one or more servers or one or more user equipment (UEs);
   receiving, by the SBS via the core network, other data packets from the one or more servers or the one or more UEs; and
   transmitting, by the SBS, the other data packets to the respective connected devices.

26. The DCA method of claim 23, wherein the respective connected devices include one or more of Internet of Things (IoT) devices or client UEs, and the SBS is an evolved NodeB (eNB) or a home eNB in a Long Term Evolution (LTE) cellular network, or a next generation NodeB (gNB) in a Fifth Generation (5G) cellular network.

* * * * *